United States Patent
Duong et al.

(10) Patent No.: US 12,153,885 B2
(45) Date of Patent: Nov. 26, 2024

(54) MULTI-FEATURE BALANCING FOR NATURAL LANGUAGE PROCESSORS

(71) Applicant: Oracle International Corporation, Redwood Shores, CA (US)

(72) Inventors: Thanh Long Duong, Seabrook (AU); Vishal Vishnoi, Redwood City, CA (US); Mark Edward Johnson, Castle Cove (AU); Elias Luqman Jalaluddin, Seattle, WA (US); Tuyen Quang Pham, Springvale (AU); Cong Duy Vu Hoang, Wantirna South (AU); Poorya Zaremoodi, Melbourne (AU); Srinivasa Phani Kumar Gadde, Fremont, CA (US); Aashna Devang Kanuga, Foster City, CA (US); Zikai Li, Redwood City, CA (US); Yuanxu Wu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 338 days.

(21) Appl. No.: 17/580,535

(22) Filed: Jan. 20, 2022

(65) Prior Publication Data
US 2022/0229991 A1 Jul. 21, 2022

Related U.S. Application Data

(60) Provisional application No. 63/139,695, filed on Jan. 20, 2021.

(51) Int. Cl.
*G06F 40/289* (2020.01)
*G06F 40/166* (2020.01)
(Continued)

(52) U.S. Cl.
CPC .......... *G06F 40/289* (2020.01); *G06F 40/166* (2020.01); *G06F 40/279* (2020.01);
(Continued)

(58) Field of Classification Search
None
See application file for complete search history.

(56) References Cited

U.S. PATENT DOCUMENTS 9,659,560 B2 * 5/2017 Cao .......................... G06N 3/04
9,715,660 B2 7/2017 Parada San Martin et al.
(Continued)

OTHER PUBLICATIONS

International Application No. PCT/US2022/013060, International Search Report and Written Opinion mailed on Apr. 22, 2022, 9 pages.
(Continued)

*Primary Examiner* — Bhavesh M Mehta
*Assistant Examiner* — Jean D. Aristilde
(74) *Attorney, Agent, or Firm* — Kilpatrick Townsend & Stockton LLP

(57) ABSTRACT

Techniques are disclosed for systems including techniques for multi-feature balancing for natural langue processors. In an embodiment, a method includes receiving a natural language query to be processed by a machine learning model, the machine learning model utilizing a dataset of natural language phrases for processing natural language queries, determining, based on the machine learning model and the natural language query, a feature dropout value, generating, and based on the natural language query, one or more contextual features and one or more expressional features that may be input to the machine learning model, modifying at least one or the one or more contextual features and the one or more expressional features based on the feature dropout value to generate a set of input features for the machine learning model, and processing the set of input features
(Continued)

features to cause generating an output dataset for corresponding to the natural language query.

10 Claims, 12 Drawing Sheets

(51) Int. Cl.
| | |
|---|---|
| *G06F 40/205* | (2020.01) |
| *G06F 40/263* | (2020.01) |
| *G06F 40/279* | (2020.01) |
| *G06F 40/295* | (2020.01) |
| *G06N 3/08* | (2023.01) |
| *H04L 51/02* | (2022.01) |

(52) U.S. Cl.
CPC ............ *G06F 40/295* (2020.01); *G06N 3/08* (2013.01); *G06F 40/205* (2020.01); *G06F 40/263* (2020.01); *H04L 51/02* (2013.01)

(56) References Cited

U.S. PATENT DOCUMENTS

| | | | |
|---|---|---|---|
| 11,481,388 B2* | 10/2022 | Sianez | G06F 16/243 |
| 2016/0293167 A1* | 10/2016 | Chen | H04N 21/23406 |
| 2018/0336464 A1 | 11/2018 | Karras et al. | |
| 2019/0130904 A1 | 5/2019 | Homma et al. | |
| 2019/0347323 A1* | 11/2019 | Riesa | G06F 40/232 |
| 2020/0126533 A1 | 4/2020 | Doyle et al. | |
| 2020/0342032 A1 | 10/2020 | Subramaniam et al. | |
| 2021/0327413 A1* | 10/2021 | Suwandy | G06N 3/045 |
| 2022/0044671 A1* | 2/2022 | Kapoor | G10L 15/063 |

OTHER PUBLICATIONS

NLP—Is Gazetteer a cheat?, Data Science, GitLAB, Question and Answer Section, asked Jan. 25, 2015 and Edited Jun. 9, 2019, retrieved from: https://datascience.stackexchange.com/questions/9950/nlp-is-gazetteer-a-cheat , Jan. 24, 2022, 3 pages.

Liu, et al., "Towards Improving Neural Named Entity Recognition with Gazetteers" *Proceedings of the 57th Annual Meeting of the Association for Computational Linguistics*, pp. 5301-5307 Florence, Italy, Jul. 28-Aug. 2, 2019.

Magnolini, et al., "How to Use Gazetteers for Entity Recognition with Neural Models". *Proceedings of the 5th Workshop on Semantic Deep Learning (SemDeep-5), Association for Computational Linguistics* , Aug. 2019, 10 pages.

Peshterliev, et al., "Self-Attention Gazetteer Embeddings for Named-Entity Recognition", *Computer Science > Computation and Language, Cornell University*, arXiv:2004.04060, Apr. 2020, 6 pages.

Song, "Improving Neural Named Entity Recognition with Gazetteers", *Computer Science > Computation and Language, Cornell University*, arXiv:2003.03072v1, Mar. 2020, 8 pages.

Song, et al., "Gazetteer Generation for Neural Named Entity Recognition", *The Thirty-third International FLAIRS Conference*, pp. 298-302, May 2020, 4 pages.

Yang, et al., "Drop-out Conditional Random Fields for Twitter with Huge Mined Gazetteer", *Proceedings of NAACL-HLT 2016*, pp. 282-288, San Diego, California, Jun. 12-17, 2016.

* cited by examiner

MULTI-FEATURE BALANCING FOR NATURAL LANGUAGE PROCESSORS

CROSS REFERENCE TO RELATED APPLICATIONS

This application is a non-provisional application of and claims the benefit of and priority to U.S. Provisional Patent Application No. 63/139,695, filed Jan. 20, 2021, which is incorporated by reference herein in its entirety for all purposes.

FIELD OF THE INVENTION

The present disclosure relates generally to chatbot systems, and more particularly, to techniques for multi-feature balancing for training and implementing chatbot systems in natural language processing systems.

BACKGROUND

Instant messaging functionality and automated chat platforms are efficient solutions to modern customer service issues. Organizations can leverage these practices to provide timely and responsive service to their customers without committing valuable human capital to individual user inquiries. These chatbots are configured to process queries, sometimes called utterances, written in natural language formats that simulate human speech patterns. Unlike verbal speech patterns between humans, natural language phrases in writing formats often do not capture important factors inherent to the phrases, such as speech cadences, contexts, emphasis, and other factors. Accordingly, it can be difficult for computer systems to process written natural language queries and determine appropriate responses thereto. This is especially problematic for chatbot systems, which are configured to generate responses to natural language queries. Humans who interact with the chatbots may become impatient, irritated, or stop using chatbot systems when a chatbot does not respond appropriately to a natural language query from the human.

Small differences in the context, cadence, spelling, tone, and/or setting of the customer inquiry can cause selection of the wrong chatbot/skill for a specific task. When an organization performs hundreds or thousands of automated inquiry responses each day, the errors in selecting chatbot can compound quickly. Simple methods of selecting chatbots such as one-to-one mapping of words to specific chatbots may fail to account for appropriate contextual analysis and do not account for the complexities of a conversation. To assist in selecting a skill, chatbots may employ machine learning models to process utterances and output a most-likely skill for responding to the utterance. Selection of a skill to assist in answering an inquiry can be based on a contextual and lexicographical analysis of the inquiry provided to the organization. In order to train these models to process a wide range of utterances, the machine learning model is thoroughly trained using a training dataset of utterances which allow the model to refine its operating parameters and better "recognize" speech patterns in utterances.

It is extremely difficult to train a machine learning model using every natural language phrase that the model may encounter. Doing so would require an extensive training set and would require an immense amount of training time. Additionally, such training risks "over-fitting" the model, a situation in which a natural language processing model will associate natural language phrases with exact ground-truth or "gold" labels in the training data, meaning the model will have difficulty processing phrases the model has not been trained on. To remedy these issues, a natural language processing processor may utilize a dataset of natural language phrases corresponding to a category of label, referred to as a "gazetteer." The natural language model, while processing a natural language phrase, may recognize certain terms that are also contained in the gazetteer. The model may weigh the presence of the phrase in the gazetteer and the corresponding category label associated with the gazetteer when processing the natural language phrase. For example, the utterance "I would like to see a map of Colerain, Ohio" may be input to a natural language processing machine learning model to predict a chatbot skill for processing the utterance. The training dataset used to train the model is very unlikely to contain the term "Colerain, Ohio," but a corresponding gazetteer with the associated categorical label of "Location" may contain the term. Accordingly the model may weigh the fact that the "Location" gazetteer contained the same term when processing the utterance to determine a categorical label associated with the utterance.

The use of gazetteers introduces expressional features to a natural language processor that aid in the prediction of an associated label for an input natural language query. However, the expressional natural of the gazetteer may cause improper weighing of certain natural language phrases toward expressional features based on the gazetteer versus contextual features that are determined by the natural language processor. For example, the utterance "please mark these papers" contains the word "mark," which may correspond to a gazetteer list of common first names with the category label "Names," as "Mark" is a common first name. However, the term "mark" is used as a verb in the given utterance. Though the utterance is not related to names, the model's reliance upon the expressional features generated by the gazetteer will cause the model to make an incorrect prediction of a label of "Name" to be associated with the utterance. Thus, the lack of gazetteers requires natural language processing models to process phrases that were likely not in the training data used to train the model, and the introduction of gazetteers may cause the models to become overly-reliant on expressional features of the gazetteer at the expense of contextual features generated by the model.

BRIEF SUMMARY

Techniques are disclosed for multi-factor balancing for training chatbot systems in natural language processing.

In a particular example embodiment, a computer-implemented method comprises receiving, by a computing device, an indication of a first coverage value corresponding to a desired overlap between a dataset of natural language phrases and a training dataset for training a machine learning model; determining, by the computing device, a second coverage value corresponding to a measured overlap between the dataset of natural language phrases and the training dataset; determining, by the computing device, a coverage delta value based on a comparison between the first coverage value and the second coverage value; modifying, by the computing device and based on the coverage delta value, at least one of the dataset of natural language phrases and the training dataset; and processing, by the computing device utilizing a machine learning model including the modified dataset of natural language phrases, an input dataset including a set of input features, wherein the machine learning model processes the input dataset based at least in part on dataset of natural language phrases in order to generate an output dataset.

In some examples, the method further comprises determining the second coverage value by determining a number of natural language phrases from the dataset of natural language phrases also present in the training data, wherein each of the natural language phrases also in the dataset correspond to a category matching a category associated with the dataset of natural language phrases. In some further examples, modifying at least one of the dataset of natural language phrases and the training dataset, comprises modifying the dataset of natural language phrases by updating the dataset of natural language phrases to include one or more natural language phrases associated with the category from the training data, wherein the updated dataset of natural language phrases includes a number of natural language phrases also present in the training data in a proportion greater than or equal to the first coverage value. In other further examples, modifying at least one of the dataset of natural language phrases and the training dataset, comprises modifying the training dataset updating the training dataset to include one or more natural language phrases from the dataset of natural language phrases and associating the one or more natural language phrases with the category, wherein the dataset of natural language phrases includes a number of natural language phrases also present in the updated training data in a proportion greater than or equal to the first coverage value.

In some further examples, updating the training dataset to include the one or more natural language phrases from the dataset of natural language phrases comprises generating one or more training pairs from the one or more natural language phrases, the one or more training pairs including a natural language query generated from the a natural language phrase and a gold label category that matches the category of the dataset of natural language phrases. In some further examples, processing the input dataset comprises processing, by the machine learning model, the updated training dataset to retrain the machine learning model.

In some examples, processing the input dataset comprises processing, by the machine learning model, a natural language query received by a chatbot system, wherein the machine learning model is configured to generate an output dataset including at least one of a skill and an intent associated with the chatbot for responding to the natural language query. In some examples, the machine learning model is a convolution neural network machine learning model and the set of input features correspond to input nodes of the convolutional neural network.

In another particular example embodiment, a computer-implemented method comprises receiving, by a computing device, a natural language query to be processed by a machine learning model, the machine learning model utilizing a dataset of natural language phrases for processing natural language queries; determining, by the computing device and based on the machine learning model and the natural language query, a feature dropout value; generating, by the computing device and based on the natural language query, one or more contextual features and one or more expressional features that may be input to the machine learning model; modifying, by the computing device, at least one or the one or more contextual features and the one or more expressional features based on the feature dropout value to generate a set of input features for the machine learning model; and processing, by the computing device utilizing the machine learning model, the set of input features to cause generating an output dataset for corresponding to the natural language query.

In some examples, the feature dropout value is a first contextual feature dropout value corresponding to a percentage of contextual features of the one or more contextual features, the method further comprises modifying the one or more contextual features by removing a percentage of contextual features from the one or more contextual features based on the first contextual feature dropout value, the set of input features is generated from the modified one or more contextual features and the one or more expressional features. In some further examples, the feature dropout value further comprises a second contextual feature dropout value corresponding to a percentage of contextual features of the one or more contextual features that correspond to a natural language phrase in the dataset of natural language phrases, the method further comprises determining a subset of contextual features, each contextual feature of the subset of contextual features corresponding to a natural language phrase in the dataset of natural language phrases, the method further comprises modifying the subset of contextual features by removing a percentage of contextual features from the subset of contextual features corresponding to the second contextual feature dropout value, and modifying the one or more contextual features by comprises removing a percentage of contextual features from the one or more contextual features including the modified subset of contextual features based on the first contextual feature dropout value.

In some examples, the feature dropout value is a first expressional feature dropout value corresponding to a percentage of expressional features of the one or more expressional features, the method further comprises modifying the one or more expressional features by removing a percentage of expressional features from the one or more expressional features based on the first expressional feature dropout value, and the set of input features is generated from the one or more contextual features and the modified one or more expressional features.

In some examples, the method further comprises comparing the dataset of natural language phrases to a training dataset used to train the machine learning model, and determining, based on the comparison, a noise value, the noise value corresponding to a number of natural language phrases in the dataset of natural language phrases and the training dataset associated with the same particular category and a number of natural language phrases in the dataset of natural language phrases and the training dataset associated with different categories, wherein the feature dropout value is determined at least in part based on the noise value. In some examples, the machine learning model is a convolution neural network machine learning model and the set of input features correspond to input nodes of the convolutional neural network.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
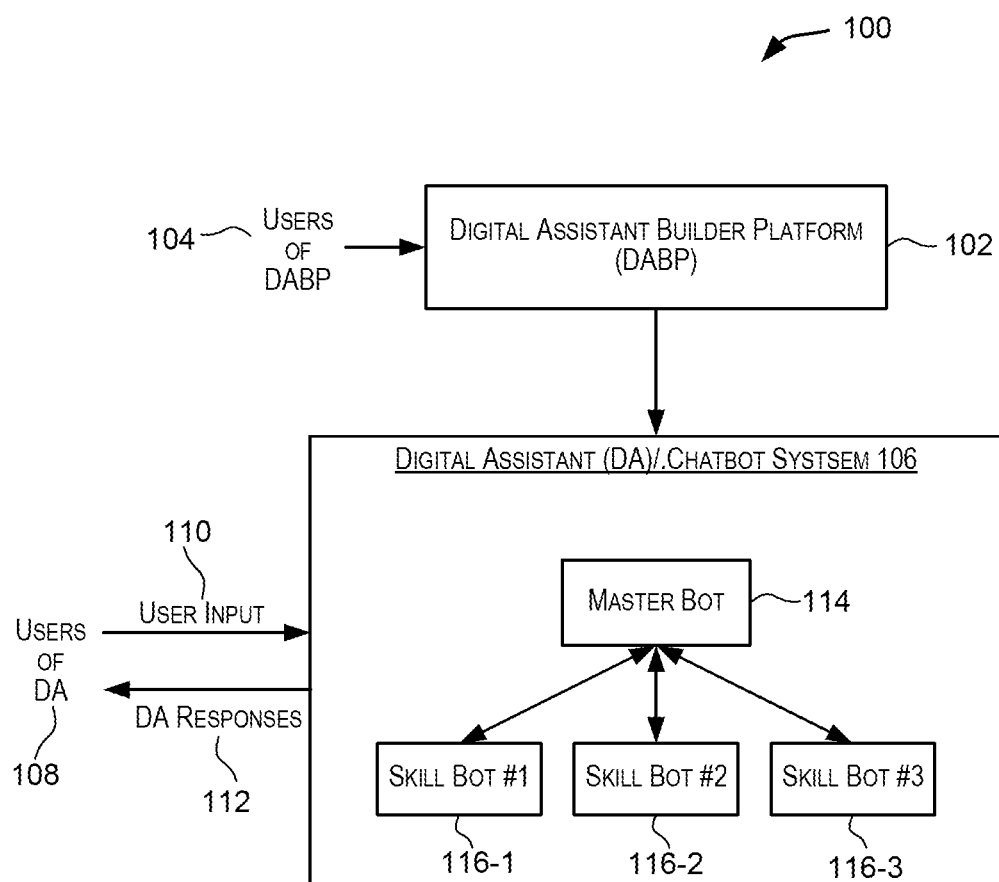
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

As described above, chatbots are useful tools for interacting with human clients and communicating with them in natural language formats. Chatbot operators seek to refine and improve chatbots to interact in a manner as closely resembling another human as possible. A human that interacts with a well-configured chatbot will have a more enjoyable experience interacting with the chatbot and will have their queries answered faster. Accordingly, it is highly advantageous for a chatbot to quickly and accurately process and respond to natural language speech generated by a human. A chatbot will process an input utterance including a natural language query from a human and responsively generate an output, for example, selection of a skill for responding to the natural language query. The skill is, for example, a subroutine of the chatbot specifically trained or configured to response to the human or accomplish some task on the humans behalf. In some instances, the chatbot processes a natural language query including the utterance to output a predicted label for the utterance, which corresponds to a predicted category associated with the utterance and which may be used to select a corresponding skill to respond to the utterance. The skill subroutine will then perform some responsive action to resolve the query.

Natural language processing inherently involves many complexities that make predicting a corresponding label from a natural language query difficult to perform. For example, contextual, or "lexicographical", features of a sentence are not easily parsed by computer-based natural language processors. The phrase "I will subscribe to this service when pigs fly" is a simple sarcastic phrase that most humans will recognize, but many natural language processors will not. A simple natural language processor may only recognize the partial phrase "I will subscribe to this service" and ignore the rest of the phrase, thus predicting that a client (e.g., a human utilizing a chatbot service through an automated virtual assistant program) wants to subscribe to a service when the opposite is true. Chatbots utilize trained machine learning models to account for contexts and other complex language-based features in natural language speech. These machine learning models are trained using a set of training data and associated with a number of "gold labels" or "ground-truth labels" that represent the correct label that a machine learning model should predict given a certain natural language query as input. The machine learning model's parameters are adjusted during training to more accurately predict labels given at least somewhat similar natural language queries as input. For example, a trained machine learning model may also recognize the phrase "I will subscribe to this service," but will also recognize the phase "when pigs fly," determine the phrase corresponds to a condition, determine that the condition is almost certainly false, and predict a label that will not cause the chatbot to automatically subscribe the user to the service.

In many cases, the machine learning model takes, as an input, one or more features. Features are data that represent aspects of a natural language phrase and allow the data to be processed by a model that will ultimately output a prediction, such as a predicted label for the natural language phrase. For example, the natural language phrase is pre-processed to generate a number of features that correspond to input nodes of an artificial neural network (ANN) machine learning model. The ANN may process the features inputs through a series of hidden layers until an output prediction is generated. A greater number of input nodes, and thus a greater number of features, allow a machine learning model to process multiple aspects of a natural language phrase, such as context, cadence, tone, semantic information, etc.

The accuracy of predictions made by a machine learning model is heavily based on the quality and quantity of training data used to train the model. However, it is very difficult to train a machine learning model on a wide breadth of words in natural language, because the number of words existing in the natural language is extensive. It is highly inefficient to attempt to create training data for each possible natural language word, and is nearly impossible to do so for each possible cadence, context, etc. for each word. Instead, a machine learning model may supplement the creation of contextual features with creation of expressional features using a pre-generated list of natural language phases, referred to herein as a "gazetteer." For example, rather than generating a training dataset with each possible proper noun name in English, a gazetteer including an extensive listing of known English names may be utilized by the machine learning model. A received natural language phrase may be further pre-processed to generate a set of expressional features that may also be input to a machine learning model to generate an output. For example, given the receive natural language query "I would like to visit Colerain, Ohio," it is highly unlikely that a machine learning model has been trained to recognize the location "Colerain, Ohio." However, a gazetteer associated with terms known to be "Towns" may contain the term "Colerain, Ohio" and a set of expressional features which will weigh the model in favor of outputting a label of "Town" are included as input to the machine learning model.

Gazetteers and other expressional lists of natural language phrases have disadvantages which may do more harm to the machine learning model than without them. For example, homophonic words and phrases present major difficulties to natural language processors. The phrase "Mark is my friend" utilizes the word "Mark" as a proper noun, but the phrase "Mark these papers and return them to me" utilizes the word "Mark" as a verb. Small differences in the context, cadence, spelling, tone, and/or setting of the customer inquiry can cause selection of the wrong chatbot/skill for a specific task. A gazetteer utilizing a list of proper nouns corresponding to "English Names" will cause generation of expressional features that will weigh in favor of classifying the natural language phrase as a "Name," when in fact, the proper label may be "Test Grading."

To overcome these challenges and others, described herein are techniques for multi-feature balancing for natural language processing to train and deploy chatbots/skills to process and respond to natural language-based queries. As described herein, multi-feature balancing refers to use of contextual information including contextual features and expressional information including expressional features to generate more accurate and efficient predictions and improve machine learning models. More specifically, the techniques described herein relate to improvements for balancing use of contextual features generated by a trained machine learning model and expressional features generated by a gazetteers and other expressional lists. The techniques described include processes for altering the composition of the gazetteers and training data to improve natural language processing and direct manipulation of generated features therefrom to facilitate more accurate and efficient predictions by a machine learning model.

For example, as described above, machine learning models which rely solely on contextual, lexicographical features for processing a natural language phrase often are not sufficiently trained on a comprehensive enough training dataset to recognize most phrases of a natural language with sufficient accuracy. The introduction of gazetteers to compensate for this deficiency tends to over-fit model predictions on expressional features that do not sufficiently account for contexts. The balancing of utilization for contextual features and expressional features to improve model predictions and well as the direct manipulation of training data and gazetteer composition allow for machine learning techniques that properly balance both types of features as part of a multi-feature balancing process for natural language processing, thus improve chatbot accuracy and interactions with clients.

Example Chatbot System

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a parent bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a parent bot/child(or sub) bot paradigm or architecture. According to this paradigm, a digital assistant is implemented as a parent bot that interacts with one or more child bots that are skill bots. For example, in the embodiment depicted in FIG. 1, digital assistant 106 comprises a parent bot 114 and skill bots 116-1, 116-2, etc. that are child bots of parent bot 114. In certain embodiments, digital assistant 106 is itself considered to act as the parent bot.

A digital assistant implemented according to the parent-child bot architecture enables users of the digital assistant to interact with multiple skills through a unified user interface, namely via the parent bot. When a user engages with a digital assistant, the user input is received by the parent bot. The parent bot then performs processing to determine the meaning of the user input utterance. The parent bot then determines whether the task requested by the user in the utterance can be handled by the parent bot itself, else the parent bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the parent bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common parent bot interface and behind the scenes multiple skill bots are provided for handling the user request.

In certain embodiments, in a parent bot/child bots infrastructure, the parent bot is configured to be aware of the available list of skill bots. The parent bot may have access to metadata that identifies the various available skill bots, and for each skill bot, the capabilities of the skill bot including the tasks that can be performed by the skill bot. Upon receiving a user request in the form of an utterance, the parent bot is configured to, from the multiple available skill bots, identify or predict a specific skill bot that can best serve or handle the user request. The parent bot then routes the utterance (or a portion of the utterance) to that specific skill bot for further handling. Control thus flows from the parent bot to the skill bots. The parent bot can support multiple input and output channels.

While the embodiment in FIG. 1 shows digital assistant 106 comprising a parent bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and the their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
(a) a context section
(b) a default transitions section
(c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the parent bot). At the parent bot or digital assistant level, built-in system intents may be configured for the digital assistant. These built-in system intents are used to identify general tasks that the digital assistant itself (i.e., the parent bot) can handle without invoking a skill bot associated with the digital assistant. Examples of system intents defined for a parent bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the parent bot to select a particular skill bot for handling an utterance.

At the parent bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or parent bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the parent bot itself according to the selected system intent.

Figure 2:
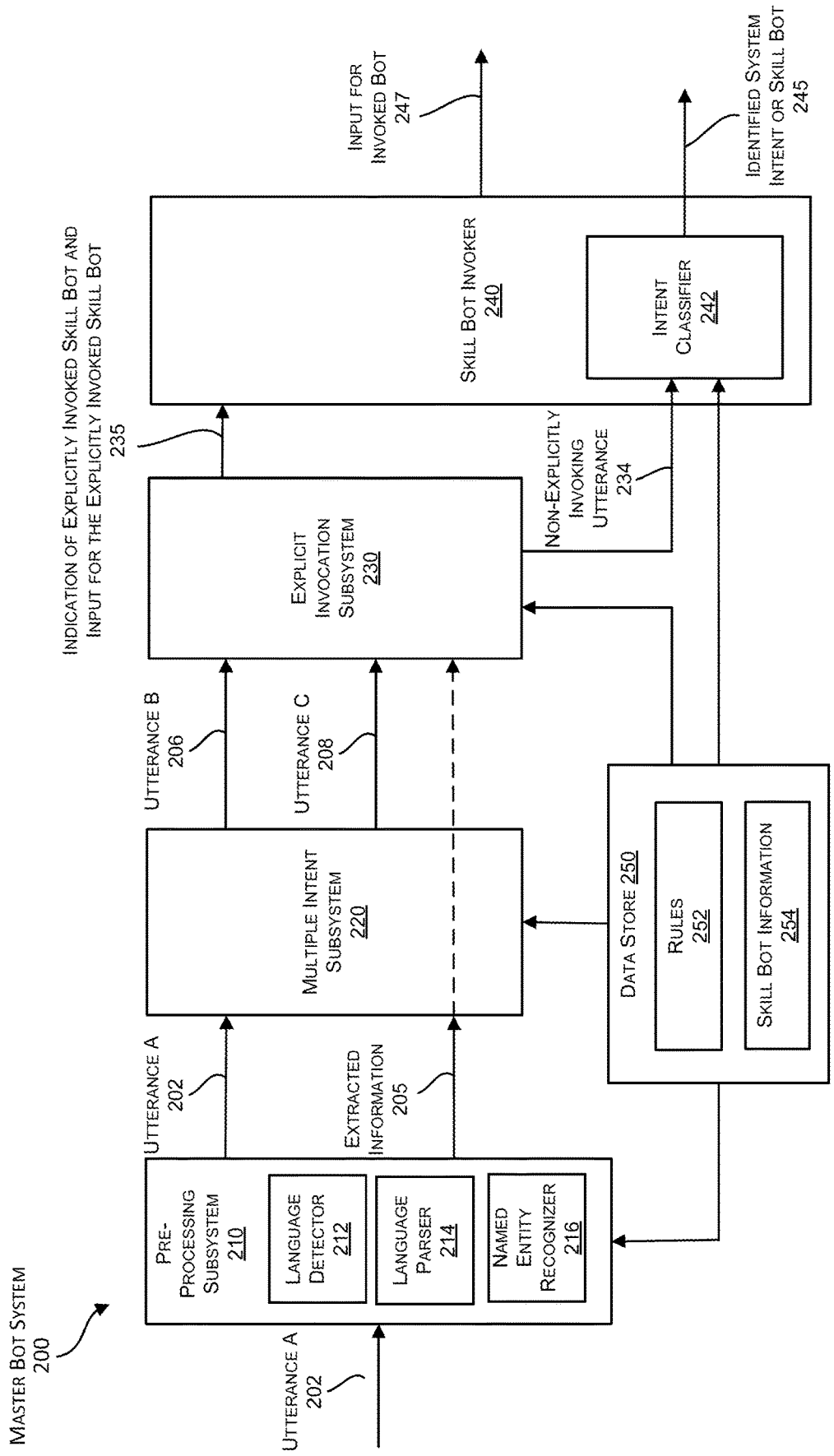
FIG. 2 is a simplified block diagram of a parent bot (MB) system according to certain embodiments.

FIG. 2 is a simplified block diagram of a parent bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a parent bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
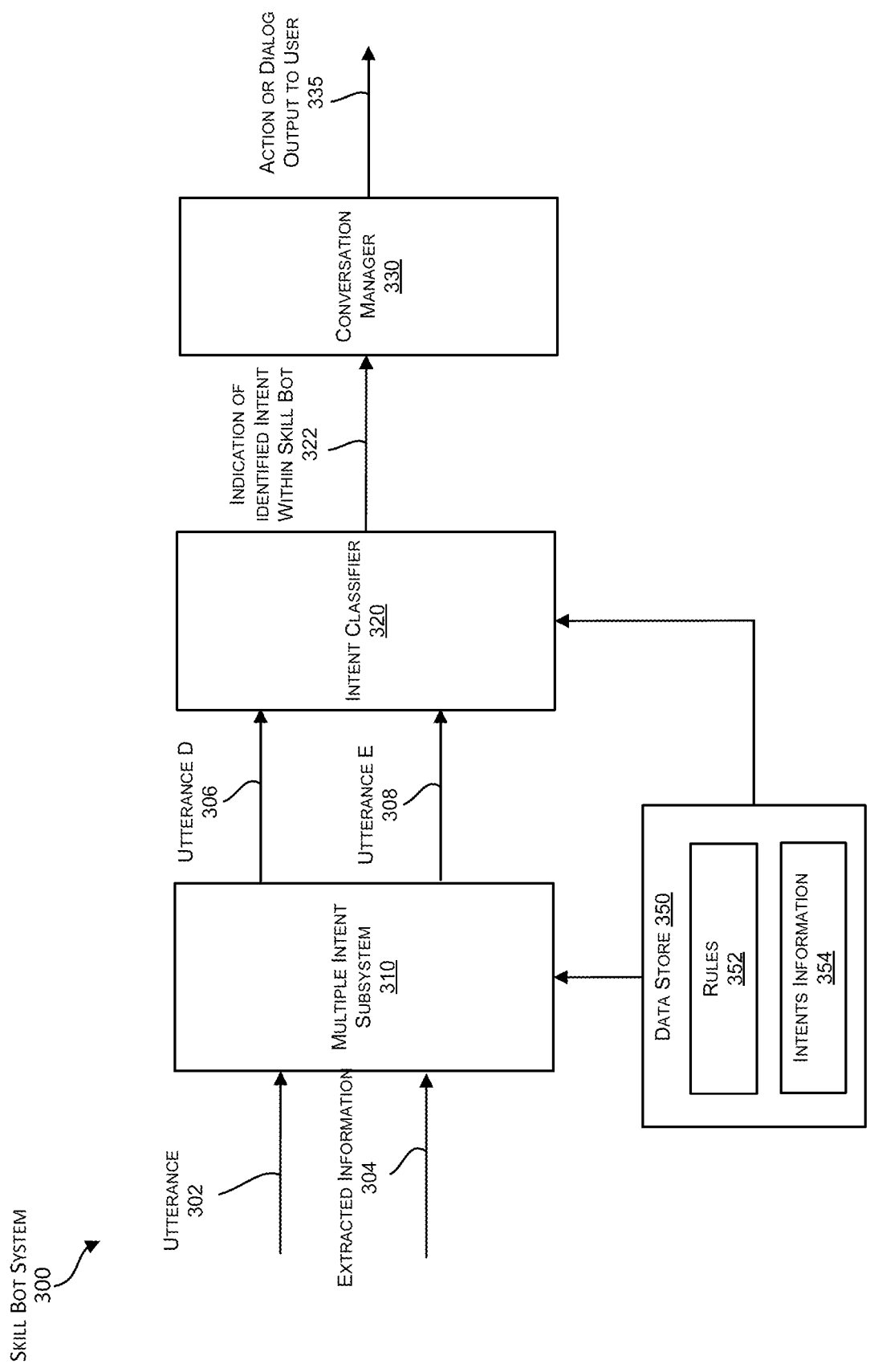
FIG. 3 is a simplified block diagram of a skill bot system according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the parent bot itself) that can handle the utterance 202. Therefore, the processing performed by MIS 220 does not require knowledge of what bots are in the chatbot system (e.g., the identities of skill bots registered with the parent bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the parent bot to determine which bot to use for handling the utterance. In some instances, the intent classifier 242 will determine that the parent bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the parent bot has to perform. For example, when there is an explicit invocation, the parent bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the parent bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the parent bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the parent bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the parent bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the parent bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular parent bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 4 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a parent bot. When the utterance 302 is supplied through a parent bot, e.g., as a result of processing through MIS 220 and EIS 230 in the embodiment depicted in FIG. 4, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the parent bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the parent bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a parent bot or digital assistant, e.g., the data store 250 in FIG. 2.

Example Data Processing System

Figure 4:
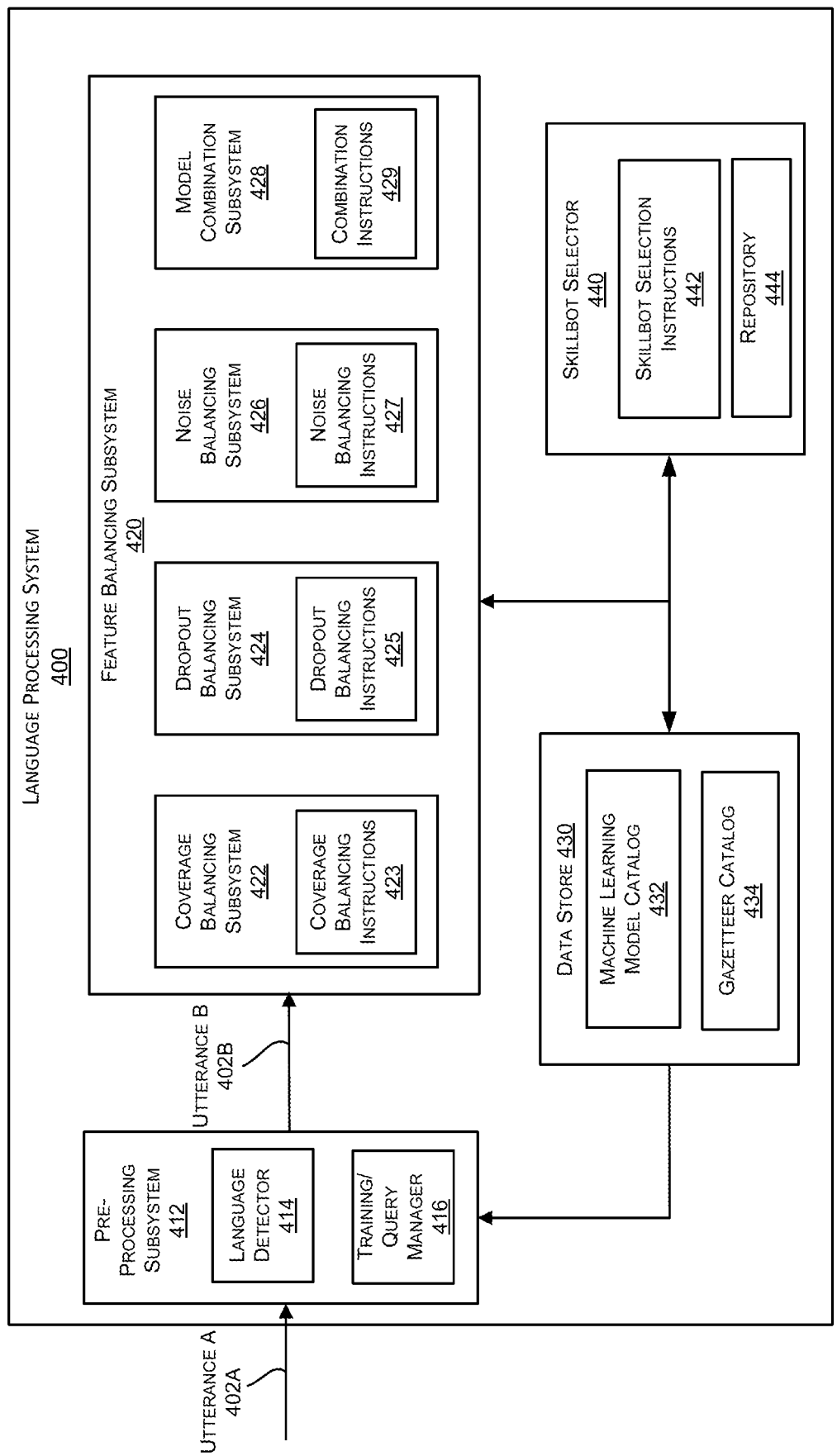
FIG. 4 is a simplified block diagram of a computing system implementing a language processing system.

FIG. 4 is a simplified block diagram of a computing system implementing a language processing system. Language processing system 400 may be any system, device, hardware, software, computer-readable medium, or other entity which performs or aids in the performance of the methods discussed herein. Language processing system 400 comprises pre-processing subsystem 412. Pre-processing system may be any system which is capable of intake of input which may be relevant to the procedures of language processing system 400. For example, pre-processing subsystem 412 may be programmed to intake an utterance such as utterance A 402A and determine how to process and route the utterance.

In an embodiment, utterance A 402A is a user query from a user interacting or seeking to interact with a chatbot system. In another embodiment, utterance A 402A is training data for training machine learning models. Pre-processing subsystem 412 includes language detector 414 which allows pre-processing system 412 to detect language that is input thereto. Pre-processing subsystem 412 includes training/query manager 416. Training/query manager 416 may detect whether utterance A 402A is a training set of data or a query from a human client to determine the manner in which the pre-processing subsystem 412 should route the utterance. For example, if the utterance is training data, the pre-processing subsystem 412 will route the training data to a training subsystem to retrain a machine learning model. If the utterance is a natural language query from a client seeking resolution to the query, pre-processing subsystem 412 will route the utterance in a manner for such that the machine learning model will receive features of the utterance an input to generate an output of prediction data. In an embodiment, pre-processing subsystem 412 will transform data from utterance A 402A into language or data more easily parsed by a language parsing subsystem, such as utterance B 402B. For example, pre-processing subsystem 412 may include a natural language pre-processor system that will transform a natural language query into one or more features that will be input to the machine learning model. The features may include contextual features determined based on lexicographical information generated based on the natural language phrase and expressional features generated based on a gazetteer or other expressional phrase list.

Language processing system 400 further includes feature balancing subsystem 420. In various embodiments, feature balancing subsystem 420 is an entity within language processing system 400 which is capable of processing, training, or otherwise using natural language data to perform the methods discussed herein. In various embodiments, feature balancing subsystem 420 includes one or more subsystems including instructions for executing multi-feature balancing for natural language processors.

Feature balancing subsystem 420 includes coverage balancing subsystem 422. Coverage balancing subsystem 422 is a subsystem configured and implemented to perform coverage balancing methods such as those described herein. Examples of coverage balancing methods will be discussed further below with reference to FIGS. 5 and 6. Coverage balancing subsystem 422 includes coverage balancing instructions 423 which includes steps for performing the coverage balancing steps described herein, as well as values, ranges, or any other kind of parameters which will affect the manner in which coverage balancing subsystem 422 will operate.

Feature balancing subsystem 420 includes dropout balancing subsystem 424. Dropout balancing subsystem 424 is a subsystem configured and implemented to perform dropout-based balancing methods such as those described herein. Examples of dropout-based balancing methods will be discussed further below with reference to FIGS. 7 and 8. Dropout balancing subsystem 424 includes dropout balancing instructions 425 which includes steps for performing the dropout balancing steps described herein, as well as values, ranges, or any other kind of parameters which will affect the manner in which dropout balancing subsystem 424 will operate.

Feature balancing subsystem 420 includes noise balancing subsystem 426. Noise balancing subsystem 426 is a subsystem configured and implemented to perform dropout-based balancing methods utilizing noise-based balancing methods, such as those described herein. Examples of noise-based balancing methods will be discussed further below with reference to FIG. 9. Noise balancing subsystem 426 includes noise balancing instructions 427 which includes steps for performing the noise-based balancing steps described herein, as well as values, ranges, or any other kind of parameters which will affect the manner in which noise balancing subsystem 426 will operate.

Feature balancing subsystem 420 includes model combination subsystem 428. Model combination subsystem 428 is a subsystem configured and implemented to combine one or more models for the purposes multi-feature balancing according to methods such as those described herein. Model combination subsystem 428 includes combination instructions 429 which may include instructions, equations, transformations, or any other kind of combination criteria which will determine the manner in which model combination subsystem 428 will be implemented. For example, model combination subsystem 428 may cause a combination of balancing instructions from subsystems 422, 424, and/or 426 to be implemented as part of a process for multi-feature balancing for natural language processing.

Language processing system 400 includes data store 430. Data store 430 may be any kind of storage, memory, repository, or other entity which may store data and instructions for performing the methods described herein. In some embodiments, data store 430 stores multiple models for natural language processing which may be used for chatbot responses or training. Data store 430 includes machine learning model catalog 432, which is a catalog of machine learning models that may be used to process a natural language query. Data store 430 also includes gazetteer catalog 434, which is a catalog of lists of natural language phrases (i.e., gazetteers) that may be implemented by any number of machine learning models to generate expressional features as part of natural language processing.

Language processing system 400 includes skillbot selector 440. In various embodiments, skillbot selector 440 is a subsystem which will determine skills or chatbots that are best suited for responding to a query or that would be selected from an input training set of data. For example, skillbot selector 440 intakes data output by a machine learning model, such as a predicted label, to determine a skill for processing and/or responding to a natural language query. Skillbot selector 440 includes skillbot selection instructions 442 that are instructions for selecting skills, chatbots, skillbots, or any other kind of matching entity based on input data. Skillbot selector 440 further includes repository 444 that is a store of skillbots or representations of skillbots that can be selected by the skillbot selector 440.

Coverage Term Training

As discussed above, a machine learning model may use both contextual features and regular expression features during natural language processing. The contextual features input to the machine learning model are generated by a trained machine learning model which has been trained with a particular training dataset. The expressional features input to the machine learning model are generated at least in part by a gazetteer list of natural language phrases corresponding to a label, for example, a list of "names." The machine learning model will use both the contextual features and the expressional features as input to cause generation of an output prediction. However, not all gazetteers are sufficient for use with particular machine learning models. For example, a machine learning model may be trained using a training dataset including various medical-based commands and responses. A corresponding gazetteer that may be used to generate expressional features may be associated with labels of "Locations." In situations where the training dataset does not include many gold labels associated with locations, the model may become too dependent on gazetteer-based expressional features. For example, given an utterance, "My arm is hurt," the gazetteer may contain the location "Hurt, Virginia" A corresponding expressional feature generated by the gazetteer may cause the model to incorrectly predict that the utterance corresponds to a request for information on "Hurt, Virginia" instead of a request for medical attention.

Methods for multi-factor balancing include determining and automatically utilizing gazetteers with machine learning models based on a coverage metric related to the natural language terms in a gazetteer and a training dataset used to train a model. The more terms that a gazetteer contains that also match a corresponding term and label in a training dataset used to train a machine learning model, the more likely that the input of expressional and contextual features for that model will be balanced. For example, utilizing a gazetteer that contains many terms that are not in the training dataset may cause a model to become overly-reliant on expressional features from the gazetteer because the model does not generate strong contextual features corresponding to the same terms. To remedy this deficiency, a coverage metric is determined based on a gazetteer and a training dataset and the gazetteer is or is not utilized based on the coverage metric. The coverage metric may also be used to automatically alter a gazetteer or a training dataset to provide an appropriate level of coverage to utilize the gazetteer with a corresponding trained model.

Figure 5:
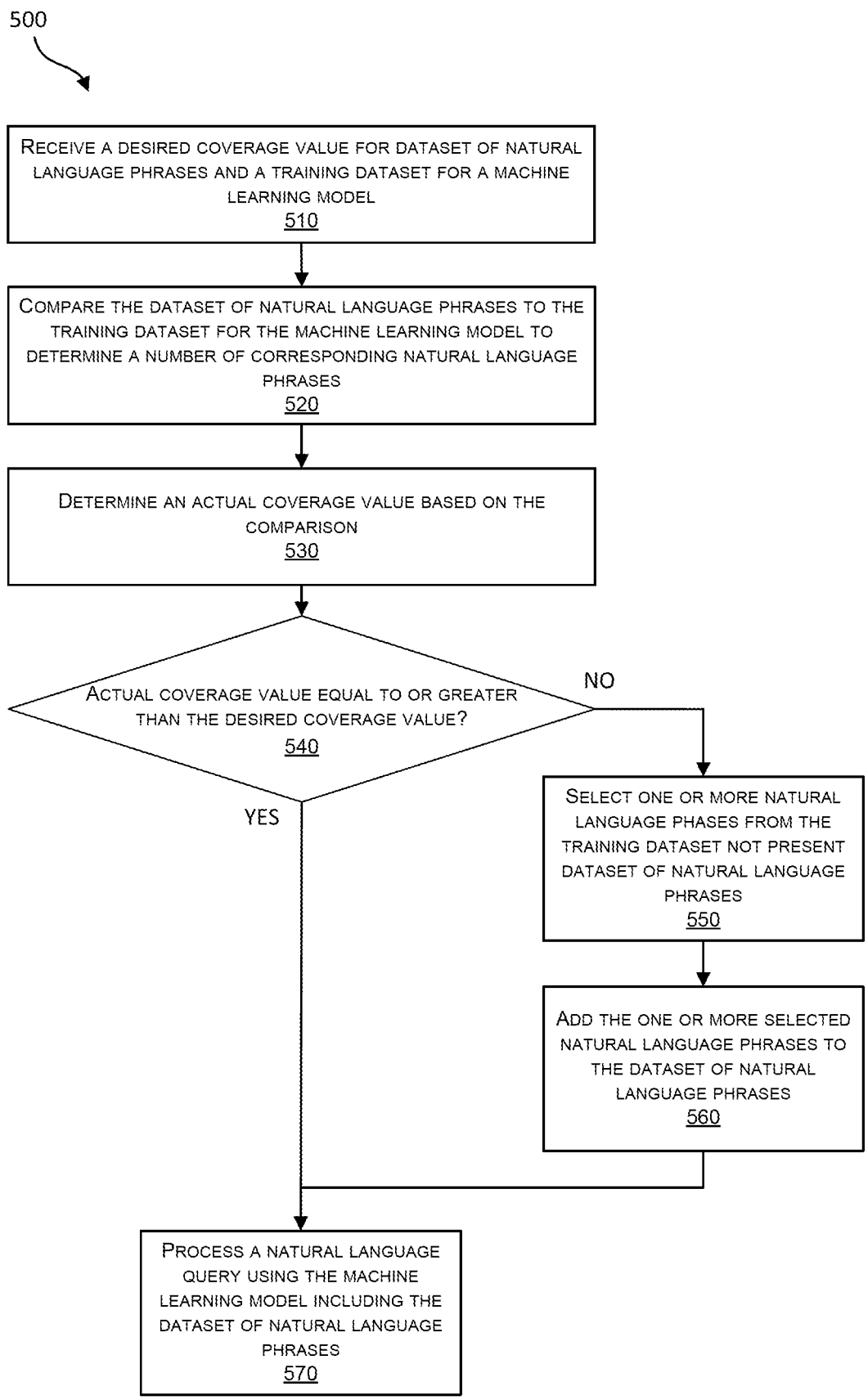
FIG. 5 illustrates a process flow for managing a dataset of natural language phrases and a training dataset for a machine learning model according to various embodiments.

FIG. 5 illustrates a process flow for managing a dataset of natural language phrases and a training dataset for a machine learning model according to various embodiments. The processing depicted in FIG. 5 is implemented in software (e.g., code, instructions, program) executed by one or more processing units (e.g., processors, cores) of the respective systems, hardware, or combinations thereof. The software is stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps is performed in some different order or some steps may also be performed in parallel. In various embodiments, the steps detailed in process 500 are performed by the systems and models discussed herein with respect to FIGS. 1-5.

Process 500 begins at 510 where a desired coverage value for a dataset of natural language phrases and a training dataset for a machine learning model is received. The dataset of natural language phrases is, for example, a gazetteer of natural language phrases that will be used to generate expressional features for input to the machine learning model. The desired coverage value relates to a relative "coverage" for the gazetteer and the training dataset. For example, the coverage value may represent a percentage of natural language phrases in the gazetteer which match a corresponding natural language phrase in the training data and for which the corresponding label of the gazetteer (e.g., "Name") matches the gold label in the training data. For example, in the training dataset used to train a machine learning model, there may be 1000 gold labels corresponding to the label "Name." A corresponding gazetteer containing a list of natural language phrases may correspond to "Names" and the gazetteer may contain 600 of the natural language phrases out of 1000 phrases corresponding to 1000 gold labels in the training data. The coverage for the gazetteer of the training data may thus be 60% (600/1000). For the reasons described above, a greater "coverage" of the training data by a gazetteer means the that expressional features generated using the gazetteer will more closely resemble the contextual features generated by the contextual machine learning model and will not cause the model to over-fit predictions on the expressional features generated.

A desired coverage value as received in 510 relates to an optimal or minimum coverage value with which a model may trust a gazetteer. The value is received, for example, by a data scientist implementing the machine learning model as part of a chatbot features, or may be determined during hyperparameter tuning of the machine learning model. For example, a desired coverage value of 80% may indicate that a contextual machine learning model should not utilize a gazetteer that does not have at least 80% coverage of the training dataset.

At 520, the dataset of natural language phrases is compared to the training dataset for the machine learning model to determine a number of corresponding natural language phrases. As described above, the gazetteer is compared to the training dataset. In various embodiments, this step comprises parsing the training dataset to determine a number of gold labels in the training dataset corresponding to a type of gazetteer (e.g., to determine an actual coverage value of the gazetteer for a particular training dataset, the label of the gazetteer is first determined to be "Locations" and the gold labels of the training dataset will be parsed to determine all gold labels with the label "Locations"). Once the gold labels have been matched to the gazetteer, the corresponding natural language phrases in the training dataset are compared to the gazetteer to determine a percentage of "overlap" between the gazetteer and the training dataset. In some embodiments, a phrase is only considered overlapping if the phrase matches perfectly by character. In other embodiments, a partial phrase in the training dataset will be considered to match a larger natural language phrase in the gazetteer if the phrase in the gazetteer contains the partial phrase as a subset of another phrase.

At 530, an actual coverage value is determined based on the comparison of the list of natural language phrase and the training dataset. For example, as described above, the actual coverage value may be the proportion of phrases in the training dataset matching the gazetteer in both label and phrase. For example, if the gazetteer matches 58 phrases in the training dataset in both phrase and label out of a possible 100 matching labels, the coverage is 58% (58/100).

At 540, a decision is made as to whether the actual coverage value determined in 530 is equal to or greater than the desired coverage value received in 510. Specifically, the comparison determines if the actual coverage value is greater than or equal to the desired coverage, value, meaning that the gazetteer sufficiently covers the training data to a permissible level as specified by the desired coverage value. For example, given a desired coverage value of 80% as specified by a data scientist, only gazetteers having at least 80% coverage will be used in conjunction with a machine learning model to process a natural language query. A gazetteer having an actual coverage value of 94% is permissible, while a gazetteer with 44% coverage is not. In some embodiments, when a gazetteer's actual coverage value is less than the desired coverage value, another gazetteer is selected for determining a coverage value with the training dataset.

At 550, if the actual coverage value is not greater than or equal to the desired coverage value, the gazetteer and/or the training dataset may be modified to cause the actual coverage value to meet or exceed the desired coverage value. For example, at 550, one or more natural language phrases are selected from the training dataset which are not present in the dataset of natural language phrases (i.e., gazetteer). The selected natural language phrases are the deficient phrases that, if contained in the gazetteer, would increase the actual coverage value of the gazetteer when compared with the training dataset.

In some embodiments, instead of, or in addition to selecting the one or more natural language phrases from the training dataset, a number of natural language phrases from the gazetteer will be selected. The selected phrases from the gazetteer corresponding to phrases that are not included in the training dataset, but if included in the training dataset, would increase the actual coverage rate. An example of this is given below with reference to FIG. 6.

At 560, the one or more selected natural language phrases selected in 550 are added to the dataset of natural language phrases to increase the actual coverage. Specifically, natural language phrases from the training dataset not in the gazetteer but having a corresponding gold label to the gazetteers label are added to the gazetteer. In some embodiments, select portions of phrases from the training dataset are added to the gazetteer instead of the entire natural language phrase selected from the training dataset. For example, a set of training data from the training dataset may include the phrase "I would like to go to Sydney Opera House." The corresponding gold label is "Location." Instead of adding the entire natural language phrase above to a gazetteer of locations, only the phrase "Sydney Opera House" is selected from the training dataset and added to the gazetteer. In various embodiments, the one or more selected natural language phrases is sufficient such that, when added to the gazetteer, a newly determined actual coverage rate will meet or exceed the desired coverage rate.

As described above, in addition or in alternative to the 550, one or more natural language phrases are selected from the gazetteer for inclusion in the training dataset. For example, phrases in the gazetteer that are not included in the training dataset may be added to the training dataset to increase actual coverage. For example, a gazetteer of names may include the phrase "Mortimer" corresponding to an English name. The training dataset may not include the name Mortimer, at least in association with a gold label of "Name." The phrase "Mortimer" may then be selected from the gazetteer and added to the training dataset with a gold label of "Name" and the newly modified training dataset will be used to retrain the contextual machine learning model. In various embodiments, the phrases from the gazetteer may be modified prior to inclusion in the training dataset. For example, a stock name-based utterance generation may cause the phrase "Mortimer" to be transformed into a full utterance of "Hello, my name is Mortimer" for inclusion into the training dataset.

At 570, once the one or more selected natural language phrases are added to the dataset of natural language phrases in 560 or if the actual coverage value is already greater than or equal to the desired coverage value as determined in 540, a natural language query is processed using the machine learning model including the dataset of natural language phrases. For example, at this point, the actual coverage value, is greater than or equal to the desired coverage value, and the gazetteer may be "trusted" to generate expressional features for a machine learning model without outweighing the contextual features generated by the machine learning model. Thus, the gazetteer will now be used to process a natural language query alongside the machine learning model. In various embodiments, the natural language query processed is a natural language query included in an utterance sent by a client for resolution by a chatbot.

Figure 6:
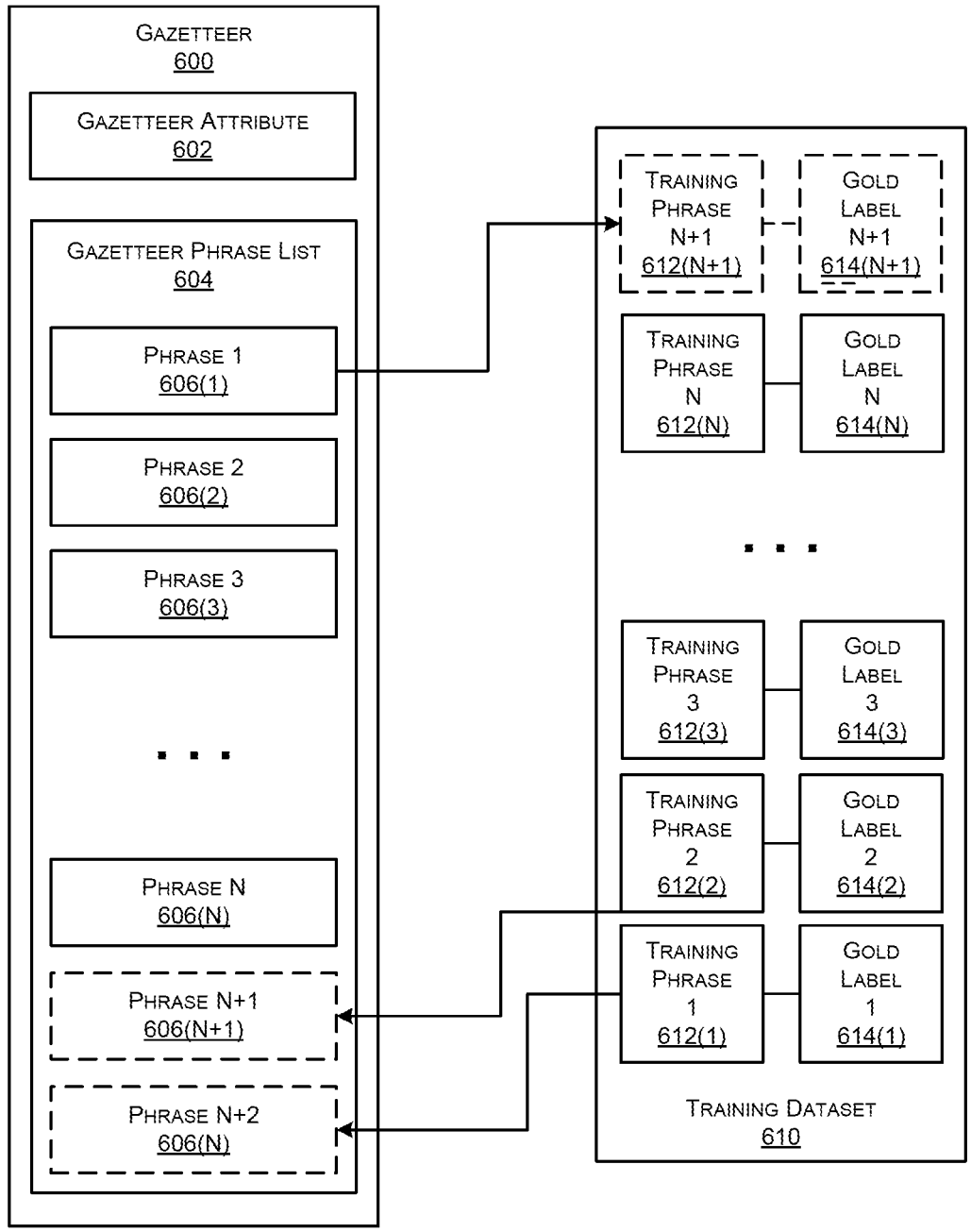
FIG. 6 illustrates an example dataset of natural language phrases and a training dataset utilized as part of a multi-factor model for natural language processing according to various embodiments.

FIG. 6 illustrates an example dataset of natural language phrases and a training dataset utilized as part of a multi-factor model for natural language processing according to various embodiments. Specifically, FIG. 6 depicts a gazetteer and a training dataset which may be altered to increase an actual coverage value between both datasets to allow the gazetteer to be used in conjunction with a machine learning model trained using the training dataset.

FIG. 6 depicts gazetteer 600. Gazetteer 600 includes gazetteer attribute 602. Gazetteer attribute 602 relates to a label of all phrases included in the gazetteer, for example "Location," "Person," etc. Each phrase in gazetteer 600 is associated with the label of gazetteer attribute 602. Gazetteer 600 includes gazetteer phrase list 604, which includes a number of phrases 606(1)-606(N). Each of the phrases 606 corresponds to the gazetteer attribute 602 (e.g., names of cities corresponding to a gazetteer attributes of "Location").

FIG. 6 depicts training dataset 610. Training dataset 610 includes sets of training data, each including a training phrase 612 and a gold label 614. As depicted, training dataset 610 includes a number of sets of training data from training phrase 612(1) and corresponding gold label 614(1) to training phrase 612(N) and corresponding gold label 614(N).

As described above with reference to FIG. 5, when altering either or both of the gazetteer 600 and the training dataset 610 to increase an actual coverage value relating to the datasets, phrases from the training dataset 610 may be added to the gazetteer 600 and vice versa. For example, as depicted in FIG. 6, training phrases 612(1) and 612(2) are added to gazetteer phrase list 604 as phrases N+1 and N+2. For example, it is determined that gold labels 614(1) and 614(2) have label types corresponding to gazetteer attribute 602, meaning each of phrases 612(1) and 612(2) would be accepted into gazetteer phrase list 604. It may be further determined that the gazetteer phrase list 604 does not contain the phrases 612(1) and 612(2). Thus, to increase the gazetteer's 600 actual coverage with the training dataset, the training phrases may be added to the gazetteer.

As depicted in FIG. 6, phrases from the gazetteer 600 may also be added to the training dataset 610. For example, it is determined that a phrase 606(1) in the gazetteer phrase list 604 is not included in the training dataset 610. The phrase 606(1) is added to the training dataset as training phrase N+1. The corresponding gold label is copied from gazetteer attribute 602, forming a complete set of training data. The training dataset may be used to retrain a machine learning model to be used in conjunction with the gazetteer 600 according to a permissible coverage rate.

Model Feature Dropout

As discussed above, coverage rates may be used to determine the manner in which gazetteers and contextually trained machine learning models work in conjunction to generate expressional features and contextual features for input to the machine learning model. Coverage balancing is an effective tool for determining the proper combination of a gazetteer and a machine learning model for processing a natural language phrase using features of the machine learning model.

The contextual features may be generated by feeding the utterances into a pretrained language model such as a Multilingual Sentence Encoder, BERT, or the like. The expressional features may be generated by gazetteer matching using various techniques including but not limited to the following. Extracting expressional or gazetteer features for each token of the input utterance using a neural classifier trained solely on gazetteers, that classifies a subsequence of tokens on the input utterance as belonging to a certain entity class with a certain confidence. Then use the output of the classifier as a feature to be integrated within a natural language model such as a preexisting BiLSTM-CRF architecture. Train a separate gazetteer classifier with augmented gazetteer data and integrate this classifier into a natural language model such as a preexisting BiLSTM-CRF architecture. Match and encode expressional or gazetteer features via self-attention mechanism and then concatenate with other features (such as: Glove, ELMO, etc.). Match and encode expressional or gazetteer features as an additional representation and then add to a natural language model such as a preexisting BiLSTM-CRF architecture. Lastly, gazetteers may be used to perform data augmentation on existing training data, and the training data may be used to fine-tune or retrain a natural language model such as a preexisting BiLSTM-CRF architecture.

Once the features have been obtained for input to the machine learning model, the features are input and a predicted output is generated from the model. For example, in embodiments where the machine learning model is a ANN, the features generated map to input nodes of the neural network. Values generated at the input nodes will be processed by a number of hidden layers before an output layer of nodes is used to generate an output, for example, a prediction of a label for a skill that will be used to respond to a natural language query. An example of an ANN machine learning model is described below with reference to FIG. 8.

The features generated can be further refined to increase or decrease the weight or certain terms to be input to the machine learning model. For example, expressional features generated using a gazetteer may be more accurate than contextual features generated by processing a natural language query with a contextual model, thus the expressional features should be given more weight when input to a machine learning model. This can be achieve with lexical dropout, or contextual dropout to lessen the weight or number of contextual features that are input to the machine learning model. A percentage based contextual dropout will randomly remove a number of contextual features from input to the machine learning model. For example, a contextual dropout rate of 20% will randomly remove up to one in five contextual features from the pool of features input to a machine learning model. However, the scattershot approach of general contextual dropout can be improved using a targeted contextual dropout which will dropout certain contextual features which are already well represented by corresponding expressional features.

For example, given the utterance "I would like to visit the Eiffel Tower", contextual features and expressional features are generated for the sub-phrase "Eiffel Tower." The expressional features generated from a gazetteer of location terms may be more important than contextual features generated from the same phrase. A gazetteer can almost certainly be relied upon to generate accurate expressional features since the Eiffel Tower is almost certain a location. Thus, the contextual features associated with Eiffel Tower may be dropped out as they would only serve to reduce the weight of the expressional features. This use of targeted expressional dropout will improve the overall accuracy of the model.

In converse cases, a model utilizing a gazetteer may tend to over-fit output predictions on expressional features. For example, given the utterance "Mark these papers, please," a gazetteer of English names may generate expressional feature for the name "Mark," when the word "Mark" is clearly not used as a name. Accordingly, an expressional dropout rate similar to the contextual dropout may be utilized to give less weight to disruptive expressional features to be input to a machine learning model. For example, a contextual analysis of the utterance "Mark these papers, please" will determine that the word "Mark" is almost certainly a verb. Therefore a targeted expressional dropout for expressional features associated with nouns (e.g. English Names) may be appropriate to avoid overfitting a prediction with incorrect expressional features. Thus, either expressional or contextual features may be targeted for dropout to improve the machine learning model processing of natural language phrases. In various embodiments, the targeted dropouts discussed herein may be used in combination with the general random dropout rates for features input to a machine learning model. For example, two percentages may be utilized for dropout, a first targeted dropout rate which will dropout features at a first rate and a second general dropout rate that will dropout features randomly after the targeted dropout has occurred.

Figure 7:
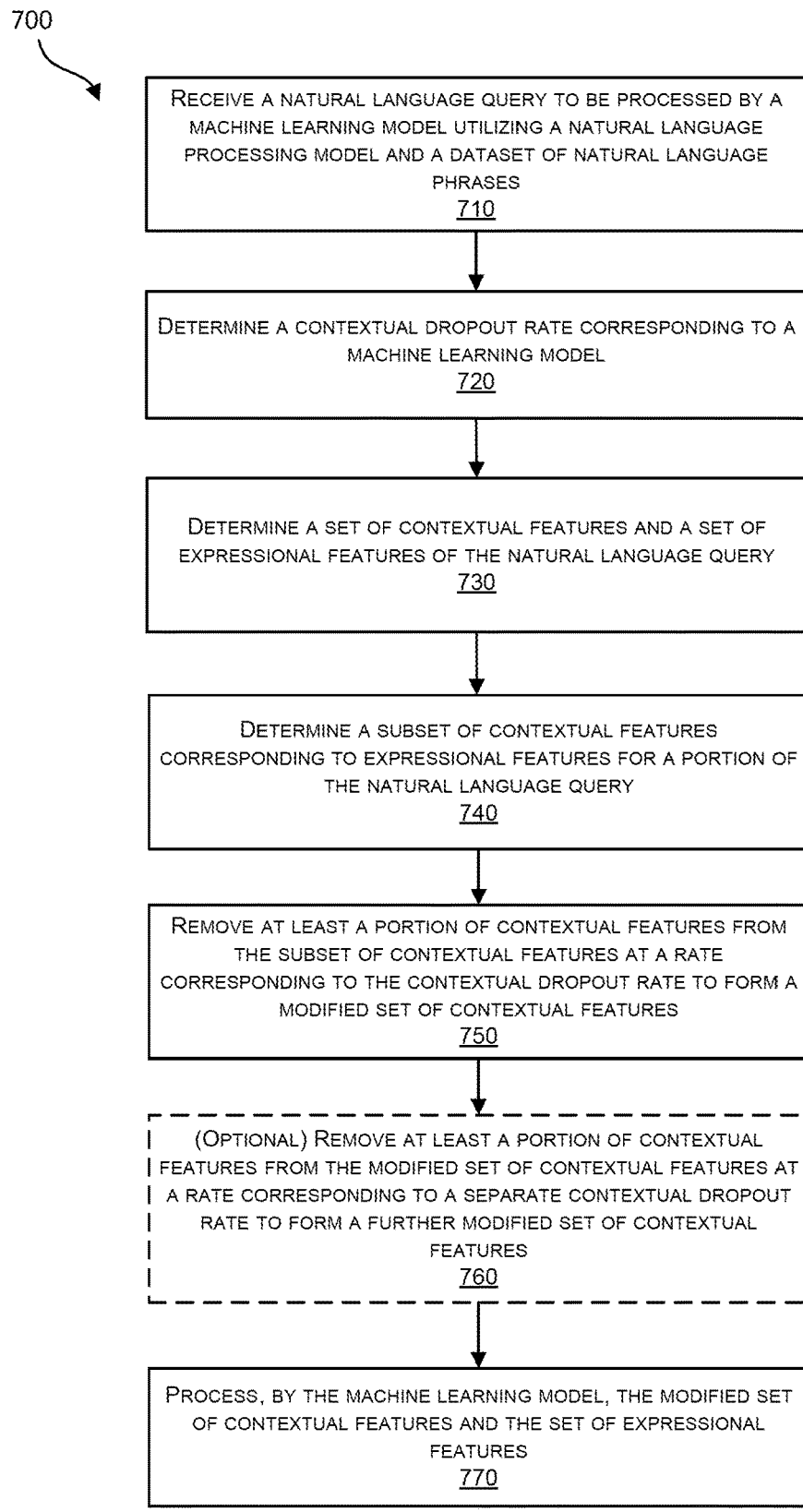
FIG. 7 illustrates a process flow for performing feature dropouts as part of multi-feature balancing for natural language processors according to various embodiments.

FIG. 7 illustrates a process flow for performing feature dropouts as part of multi-feature balancing for natural language processors according to various embodiments. The processing depicted in FIG. 7 is implemented in software (e.g., code, instructions, program) executed by one or more processing units (e.g., processors, cores) of the respective systems, hardware, or combinations thereof. The software is stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps is performed in some different order or some steps may also be performed in parallel. In various embodiments, the steps detailed in process 700 are performed by the systems and models discussed herein with respect to FIGS. 1-6.

Specifically, process 700 describes a process for targeted contextual dropout of contextual features. It will be appreciate that a corresponding expressional dropout process may be performed for dropping out expressional features in addition to or in lieu of the contextual dropout process described in FIG. 7. Process 700 begins at 710 where a natural language query to be processed by a machine learning model utilizing a natural language processing model and a dataset of natural language phrases is received. The natural language query may be received, for example, from a client interacting with an automated digital assistant to resolve the query using a chatbot. For example, the received natural language query may be utterance 402A as depicted in FIG. 4 and may be further processed according to a dropout balancing subsystem 424.

At 720, in response to receiving the natural language query, a contextual dropout rate corresponding to a machine learning model is determined. The contextual dropout rate is, for example, a targeted contextual dropout rate for dropping out contextual features prior to the input of a pool of generated features to a machine learning model. In some embodiments, the contextual dropout rate is pre-set by a data scientists or operator of the machine learning model according to a desired level of contextual dropout. In some embodiments, the contextual dropout rate is determined during hyperparameter tuning of the machine learning model.

At 730, a set of contextual features and a set of expressional features is determined. The contextual features and the expressional features are generated from the natural language query to be input to the machine learning model. Some contextual features correspond to expressional features and vice versa due to certain features being generated based on similar portions of the natural language query. For example, in the utterance "I would like to see the Eiffel Tower," the sub-phrase "Eiffel Tower" may be used to generate some expressional features and some contextual features. The expressional features, likely having been generated using a gazetteer of locations, may cause the model to make a more accurate prediction than the corresponding contextual features.

At 740, a subset of contextual features corresponding to the expressional features for a portion of the natural language query is determined. As described above with reference to 730, the subset of contextual features may correspond to the expressional features when both features were generated from the name portion of the natural language query. For example, some contextual features may correspond to expressional features when both sets of features were generated by the sub-phrase "Eiffel Tower" in the example query above. The contextual features are less likely to affect an accurate prediction than the expressional features, and thus are prime candidates for targeted contextual dropout.

At 750, at least a portion of contextual features from the subset of contextual features determined in 740 are removed from the pool of contextual features at a rate corresponding to the contextual dropout rate in order to form a modified set of contextual features. For example, given a contextual dropout rate of 20% as determined in 720, one in five features from the subset of features will be removed from the pool of contextual features prior to input of the features to the machine learning model. Thus, a targeted dropout of contextual features from the subset of contextual features corresponding to expressional features of high accuracy occurs to prevent those contextual features from improperly weighing the output of the model toward an incorrect contextual prediction.

At 760, an optional step of additional general contextual dropout may occur. For example, in addition to the targeted contextual dropout that occurs as part of 740 and 750, an additional general contextual dropout may occur. The general contextual dropout in 760 includes removing at least a portion of contextual features from the modified set of contextual features generated in 750 at a rate corresponding to a separate contextual dropout rate to form a further modified set of contextual features. For example, a random selection of contextual features may be dropped out from the pool of contextual features prior to the input of all features into a machine learning model. This will cause the two-step dropout of a first targeted dropout and a second general random dropout discussed above.

At 770, the machine learning model processes the modified set of contextual features and the set of expressional features. The machine learning model will intake, as input, the modified set of contextual features and the set of expressional features to cause processing of the features and generation of an output prediction based on the processing. For example, each of the features in the modified set of contextual features and the set of expressional features may map to an input node of an ANN in the machine learning model, though certain input nodes of the ANN may receive reduced or null values from dropped-out contextual features, thus affecting the processing of the values in the input nodes.

Figure 8:
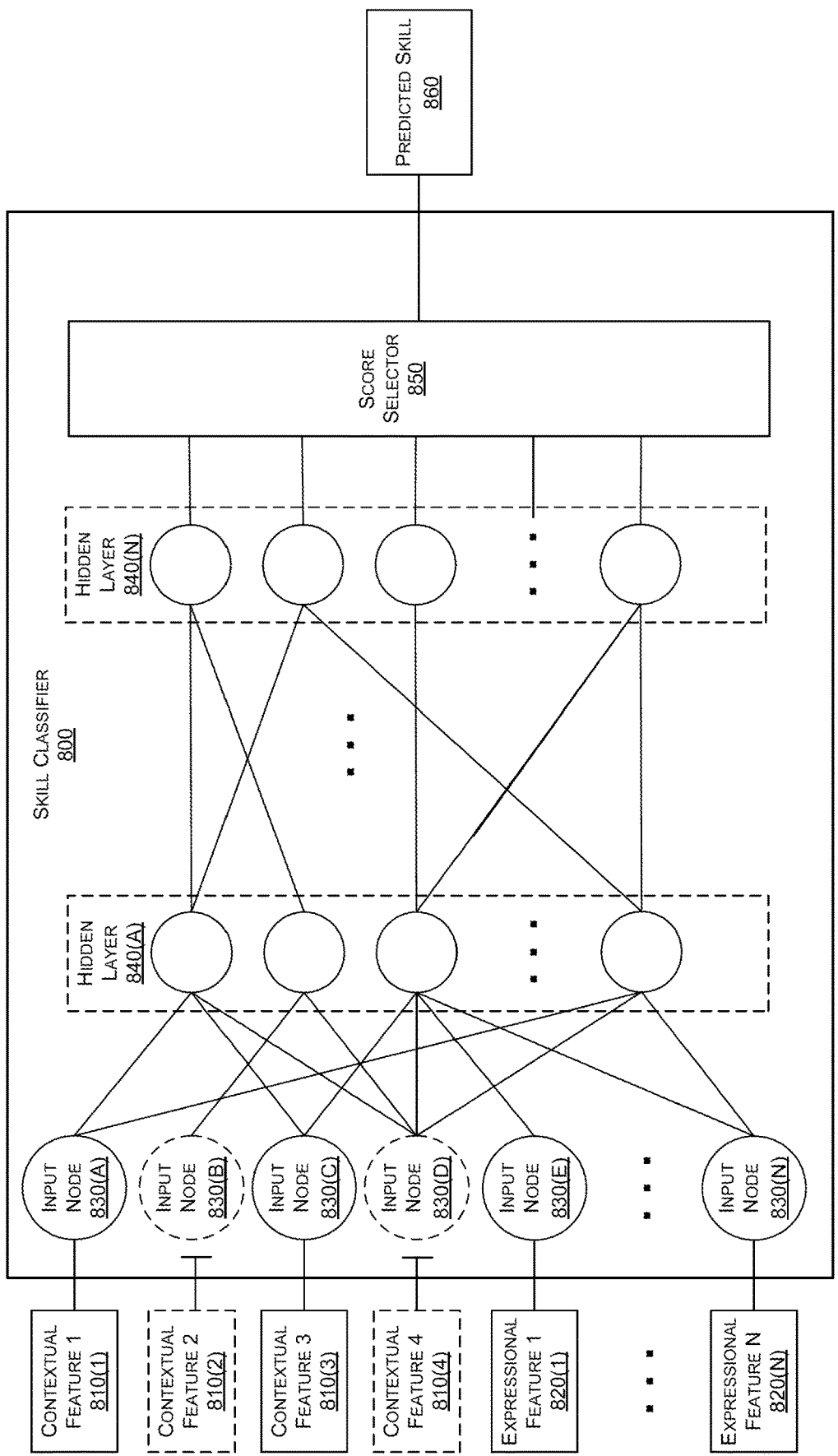
FIG. 8 is a simplified block diagram of an skill classifier artificial neural network machine learning model utilizing feature dropouts according to certain embodiments.

FIG. 8 is a simplified block diagram of a skill classifier artificial neural network machine learning model utilizing feature dropouts according to certain embodiments. Specifically, FIG. 8 depicts an example embodiment of a skill classifier machine learning model configured to utilize an artificial neural network to take, as input, a number of contextual and expressional features and output a predicted skill for processing a natural language query.

As depicted in FIG. 8, skill classifier 800 takes, an input, a number of contextual features 810(1)-810(4) and a number of expressional features 820(1)-820(N). It will be appreciated that the number of feature inputs of either kind is not limited by the example embodiment depicted in FIG. 8, and in fact may be a very large number of features to accurately reflect the various contextual and expressional features of a natural language query that may be generated. Each of the input features is mapped to an input node 830(A)-830(N) of the ANN.

As part of the dropout processes described herein, one or more features may be dropped out of the pool of inputs prior to the machine learning model skill classifier 800 processing the inputs. For example, as depicted in FIG. 8, several contextual features, including contextual feature 810(2) and 810(4) are separated from corresponding input nodes 830(B) and 830(D). This shows how input features may be dropped out to decrease the weight that certain features will have on machine learning model processing and increase the weight of others. For example, by dropping out the contextual features 810(2) and 810(4), corresponding input nodes 830 (B) and 830(D) will not generate initial values and will provide little if any nodal weight to successive hidden layers of node processing in the ANN.

The input nodes 830(A)-830(N) are mapped via one or more edges to an addition layer of the artificial neural network. For example, a number of edges emanating from the input nodes 830(A)-830(N) lead to additional nodes of a hidden layer, each of which may have a corresponding nodal parameter/weight value. For example, as depicted in FIG. 8, input nodes 830(A)-830(N) are mapped to a hidden layer 840(A) of the artificial neural network. It will be appreciated that the artificial neural network is a network including a one-to-one edge relationship of nodes in each successive layer or any subset of edges therein.

The values passed from input nodes 830(A)-830(N) is successively passed through multiple hidden layers 840(A)-840(N) to progress through the neural network. It will be appreciated that the nodal parameters/weights and in some cases weights of edges between nodes is altered according to one or more machine learning training methods. Once hidden layer 840(N) has processed the data from a previous hidden layer, the data is passed to a score selector 850. The score selector 850 may utilize one or more score selection criteria and the values received from the hidden layer 840(N) to determine a predicted skill 860 that will be output by the skill classifier 800. For example, score selector 850 may receive one or more score values pertaining to a number of possible skills from which the predicted skill 860 may be selected and utilize a criteria specifying that the highest score is chosen for selecting the predicted skill 860.

Noise Compensation Training

As discussed above, dropout rates for contextual features and expressional features may be used to balance feature processing by a machine learning model to generate more accurate predictions. In some cases, contextual features may be less likely to generate accurate results than a corresponding expressional feature or vice versa, but that does not mean that full exclusion of the phrase is beneficial. As described above, using a gazetteer to generate expressional features may cause generation of features corresponding to false positives for matching natural language terms to the gazetteer. For example, the phrase "Mark these exams as soon as possible" utilizes the term "Mark" as a verb, though a gazetteer of label type "Name" may generate expressional features that weight the model toward recognizing the term as a "Name." The problems increases as gazetteers contain more common words in a natural language. For example, the words "An" and "The" are names that may be recognized by a gazetteer, but are also extremely common linking words in the English language. Expression features generated for these words would likely overwhelm the model with insinuations that a phrase using these terms corresponds to a name, even though that is almost never the case. In this manner, the expressional features may cause a very high rate of "noise" or identification of expressional features in a given natural language query. The noise can be defined using the following equation:

$$N=a/(a+b) \qquad \text{Equation (1)}$$

where N is a score representation of the noise generated, a is a number of violating phrases (i.e., phrases in a natural language query matching a phrase in the gazetteer but for which the correct label is does not match the label of the gazetteer) and b is the number of conforming phrases (the phrase matches a phrase in the gazetteer and has a correct label matching the label of the gazetteer). For example, a gazetteer of "Names" including the terms "An" and "The" will generate a very high amount of noise (the value a is very high and the values b is very low). The noise will slow training of the machine learning model and predictions made by the machine learning model because of all the false positives generated as expressional features.

Conversely, when noise is very small (i.e., the expressional features generated a few or not highly weighted), the precision of the expressional features is high (i.e., the expressional features will not generate many false positives for phrases) but the recall of the features is very low (i.e. the expressional features are not heavily utilized and may generate many false negatives). Thus, a certain level of noise is desired when considering expressional features for input to a machine learning model. The level of noise may be controlled by performing contextual or expressional dropout of features to meet a noise threshold range. The number of violating phrases and the conforming phrases may be determined by a comparison of the gazetteer to the training dataset used to train the machine learning model. The training dataset offers an excellent opportunity to determine a predicted noise values, as the training dataset was used to train the machine learning model, and will allow for a more accurate prediction of how much noise a gazetteer will generate when used to generate expressional features of a natural language query.

Figure 9:
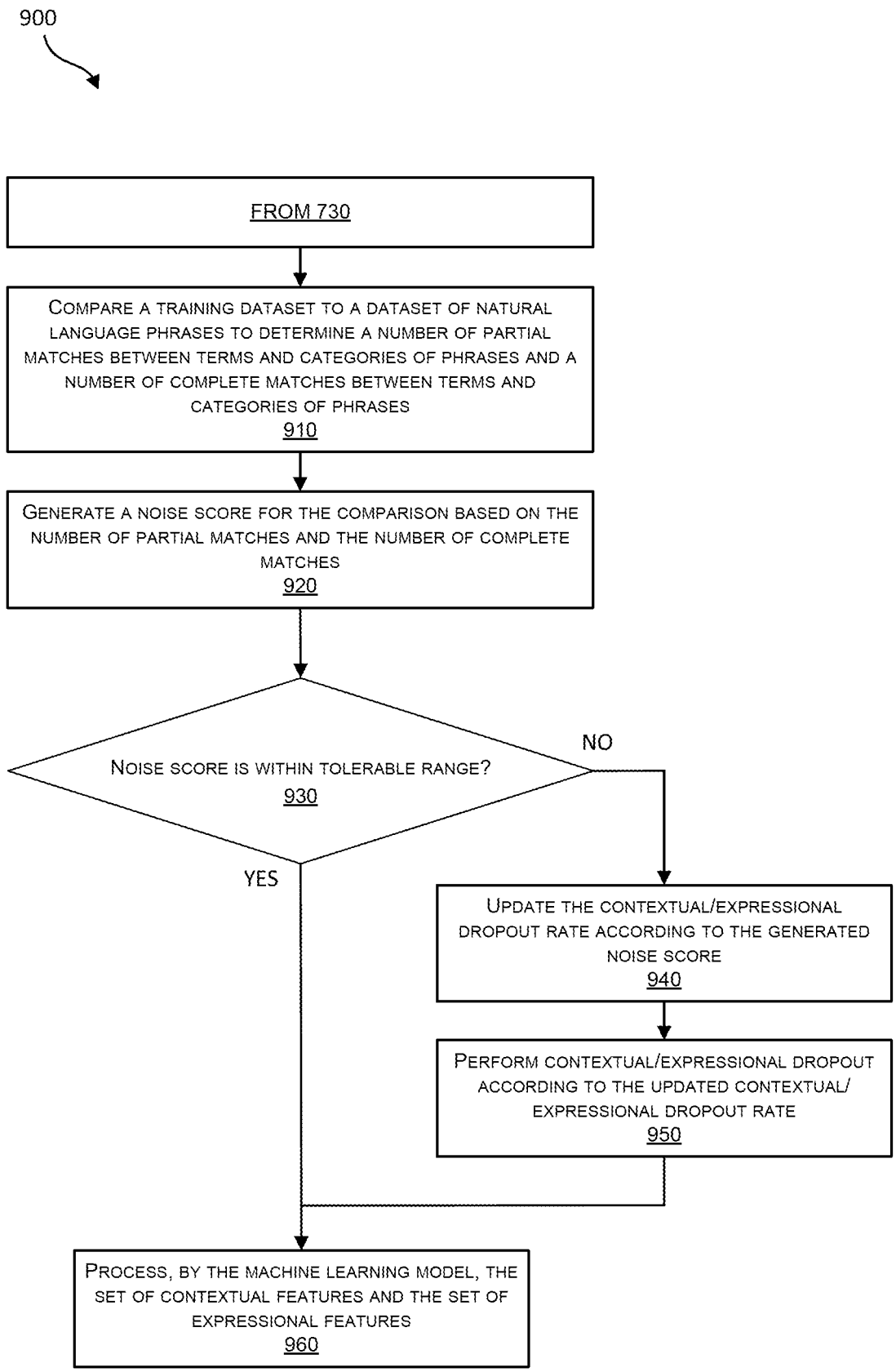
FIG. 9 illustrates a process flow for performing noise-based feature dropouts as part of multi-feature balancing for natural language processors according to various embodiments.

FIG. 9 illustrates a process flow for performing noise-based feature dropouts as part of multi-feature balancing for natural language processors according to various embodiments. The processing depicted in FIG. 9 is implemented in software (e.g., code, instructions, program) executed by one or more processing units (e.g., processors, cores) of the respective systems, hardware, or combinations thereof. The software is stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps is performed in some different order or some steps may also be performed in parallel. In various embodiments, the steps detailed in process 900 are performed by the systems and models discussed herein with respect to FIGS. 1-8.

Process 900 begins at 730 of process 700 where a set of contextual features and a set of expressional features of a natural language query is determined.

At 910, after the expressional and contextual features are determined, a training dataset is compared to a dataset of natural language phrases to determine a number of partial matches between terms and categories of phrases and a number of complete matches between terms and categories of phrases. The comparison of terms and categories corresponds to a determination of overlapping phrases of the training data and the gazetteer and a determination if the overlapping terms correspond to the same categorical label (e.g., "Location"). A partial match occurs when a phrase is included in both the training data and the gazetteer, but the gold-label associated with the phrase in the training data does not match the attribute label of the gazetteer. A complete match occurs when a phrase is included in both the training data and the gazetteer and the gold-label associated with the phrase in the training data matches the attribute label of the gazetteer.

At 920, a noise score for the comparison is generated based on the number of partial matches and the number of complete matches. For example, in Equation (1), the noise score Nis generated by dividing the number of partial matches a by the sum of the partial and complete matches a+b.

At 930, it is determined if the noise score is within a tolerable range. A specified range of noise may be permissible to avoid too much noise that will interfere with the processing of a machine learning model while at the same time ensuring proper level of recall is attained by the model when utilizing expressional features. The permissible range may be supplied, for example, by a data scientist or attained during hyperparameter tuning of the machine learning model.

At 940, if the noise score is not within the tolerable range, the contextual/expressional dropout rate is updated according to the noise score generated in 920. For example, given a permissible noise range of 0.05-0.15, a generated noise score may be 0.2. Accordingly, a number of expressional features should be dropped out prior to input to the machine learning model to avoid generation of too much noise when training the machine learning model or generating a predicted output in response to a natural language query from a client. The reduction of expressional features will reduce the number of partial matches at prediction time, thus reducing the noise score. Alternatively, given the same permissible noise range, a generated noise score may be 0.02. Accordingly a number of contextual features should be dropped out prior to input to the machine learning model to increase the weight that expressional features are given. This may increase the noise rate, but will also improve the recall of the machine learning model.

At 950, the contextual/expressional dropout is performed according to the updated contextual/expressional dropout rate. The dropout performed is described above, with reference to FIGS. 7 and 8.

At 960, following the performance of the contextual/expressional dropout or if the noise score is already within the tolerable range as determined in 930, the machine learning model processes the modified set of contextual features and the set of expressional features, which may have been modified by a dropout in 950.

Model Combination Methods

In various embodiments, multiple balancing techniques may be used, including in different proportions, to generate predictions by a machine learning model. Two or more balancing techniques may be combined in any way necessary to achieve more efficient training and prediction results according to the embodiments discussed herein. For example, coverage balancing subsystem 422 may perform coverage balancing to modify a training dataset and/or a gazetteer prior to the generation of expressional and contextual features. The resulting modified training dataset may be used to retrain a machine learning model. The modified gazetteer will then be utilized to generate expressional features alongside contextual features that will be input to the retrained machine learning model. The dropout balancing subsystem 424 and/or the noise balancing subsystem 426 may then perform rate-based and/or noise-based dropout of features prior to input of the features to the retrained machine learning model. It will be appreciated that any combination of the balancing processes described herein may be used in any combination or proportion to achieve more precise predictions and recall for a machine learning model.

Illustrative Systems

Figure 10:
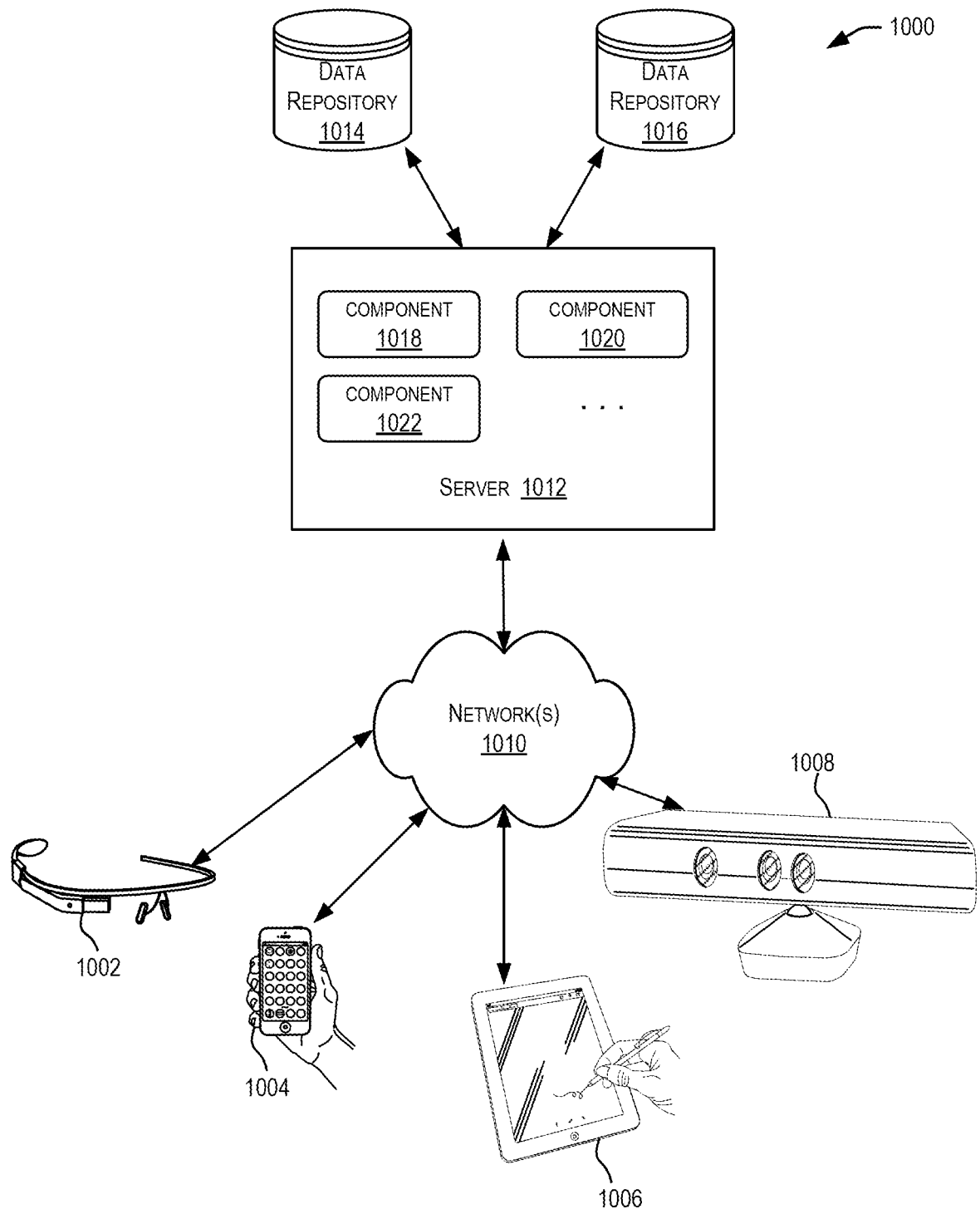
FIG. 10 depicts a simplified diagram of a distributed system for implementing various embodiments.

FIG. 10 depicts a simplified diagram of a distributed system 1000. In the illustrated example, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various examples, server 1012 may be adapted to run one or more services or software applications that enable one or more embodiments described in this disclosure. In certain examples, server 1012 may also provide other services or software applications that may include non-virtual and virtual environments. In some examples, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The example shown in FIG. 10 is thus one example of a distributed system for implementing an example system and is not intended to be limiting.

Users may use client computing devices 1002, 1004, 1006, and/or 1008 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 may include one or more virtual machines running virtual operating systems, or other computing architectures involving virtualization such as one or more flexible pools of logical storage devices that may be virtualized to maintain virtual storage devices for the server. In various examples, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain examples. For example, one or more of the data repositories 1014, 1016 may be used to store information such as information related to chatbot performance or generated models for use by chatbots used by server 1012 when performing various functions in accordance with various embodiments. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain examples, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1014, 1016 may also be used by applications to store application data. The data repositories used by applications may be of different types such as, for example, a key-value store repository, an object store repository, or a general storage repository supported by a file system.

Figure 11:
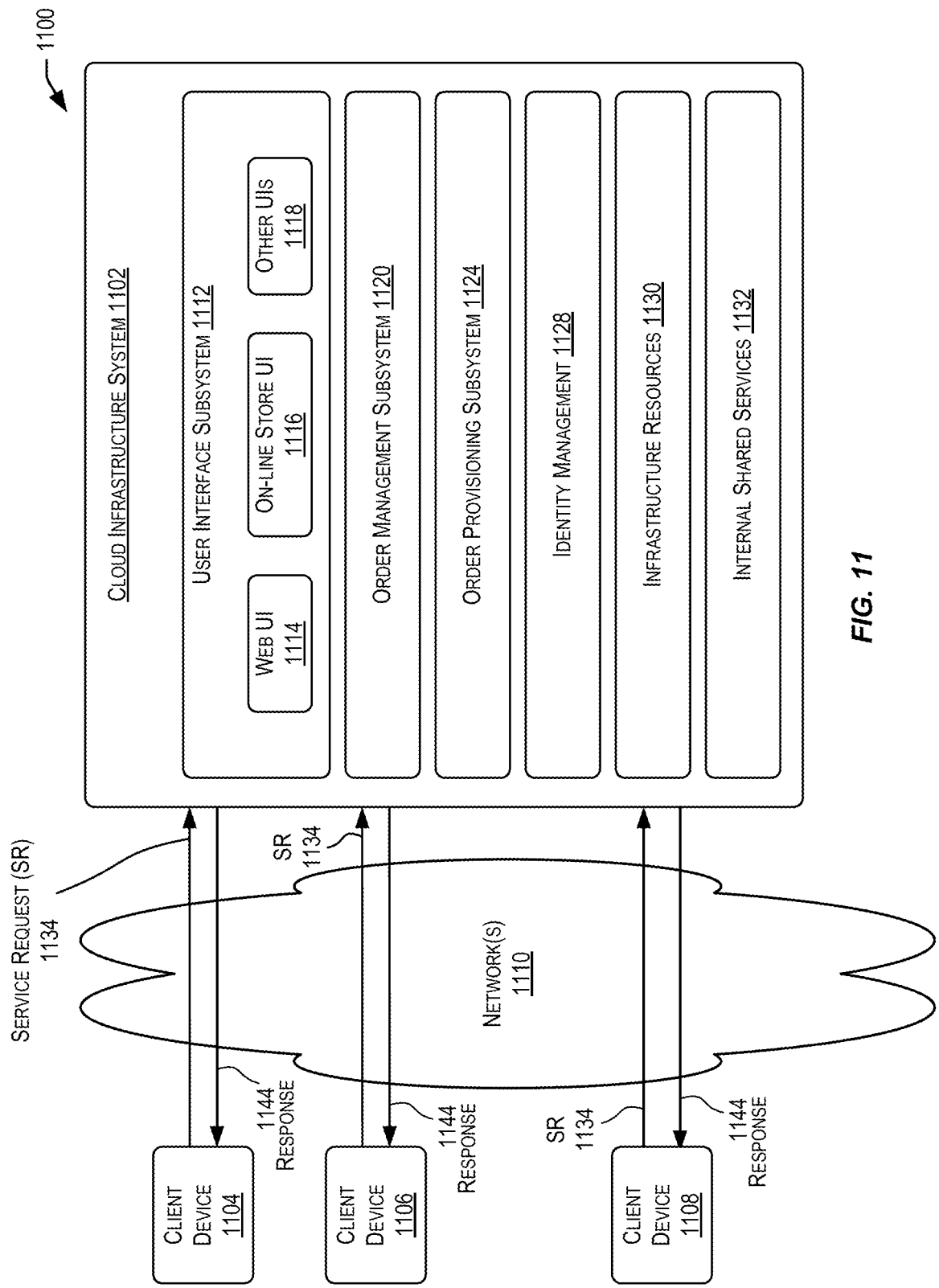
FIG. 11 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 11 is a simplified block diagram of a cloud-based system environment in which various services may be offered as cloud services in accordance with certain examples. In the example depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The example depicted in FIG. 11 is only one example of a cloud infrastructure system and is not intended to be limiting. It should be appreciated that, in some other examples, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative examples.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer may be an individual or an enterprise. In certain other examples, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as client computing devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request information or action from a chatbot as described in this disclosure.

In some examples, the processing performed by cloud infrastructure system 1102 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1102 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like. In certain examples, the storage virtual machines that are available for servicing storage requested from applications may be part of cloud infrastructure system 1102. In other examples, the storage virtual machines may be part of different systems.

In certain examples, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a service offered by cloud infrastructure system 1102. As part of the order, the customer may provide information identifying a chatbot system for which the service is to be provided and optionally one or more credentials for the chatbot system.

In certain examples, such as the example depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1102 as part of the provisioning process. Cloud infrastructure system 1102 may generate an application ID and select a storage virtual machine for an application from among storage virtual machines provided by cloud infrastructure system 1102 itself or from storage virtual machines provided by other systems other than cloud infrastructure system 1102.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1102 and information identifying a chatbot system selected by cloud infrastructure system 1102 for the chatbot system corresponding to the chatbot system ID.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain examples, cloud infrastructure system 1102 comprises an identity management subsystem (IMS) 1128 that is configured to manage customer information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
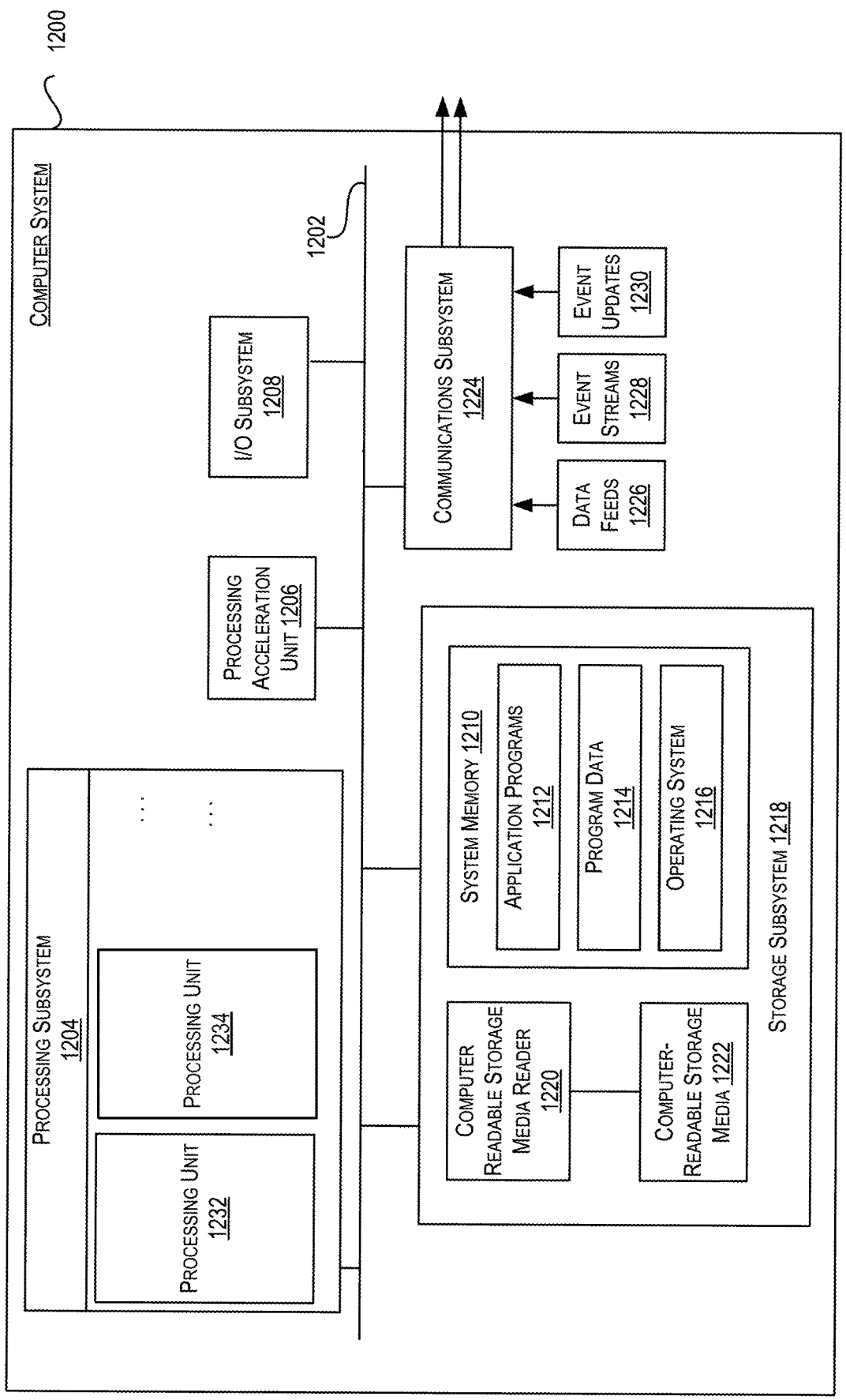
FIG. 12 illustrates an example computer system that may be used to implement various embodiments.

FIG. 12 illustrates an example of computer system 1200. In some examples, computer system 1200 may be used to implement any of the digital assistant or chatbot systems within a distributed environment, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative examples of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 may be organized into one or more processing units 1232, 1234, etc. A processing unit may include one or more processors, one or more cores from the same or different processors, a combination of cores and processors, or other combinations of cores and processors. In some examples, processing subsystem 1204 may include one or more special purpose co-processors such as graphics processors, digital signal processors (DSPs), or the like. In some examples, some or all of the processing units of processing subsystem 1204 may be implemented using customized circuits, such as application specific integrated circuits (ASICs), or field programmable gate arrays (FPGAs).

In some examples, the processing units in processing subsystem 1204 may execute instructions stored in system memory 1210 or on computer readable storage media 1222. In various examples, the processing units may execute a variety of programs or code instructions and may maintain multiple concurrently executing programs or processes. At any given time, some or all of the program code to be executed may be resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units may be allocated to each virtual machine.

In certain examples, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some examples. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide authentication in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some examples. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1218 may also include a computer-readable storage media reader 1220 that may further be connected to computer-readable storage media 1222. Reader 1220 may receive and be configured to read data from a memory device such as a disk, a flash drive, etc.

In certain examples, computer system 1200 may support virtualization technologies, including but not limited to virtualization of processing and memory resources. For example, computer system 1200 may provide support for executing one or more virtual machines. In certain examples, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, when computer system 1200 is used to implement bot system 120 depicted in FIG. 1, the communication subsystem may be used to communicate with a chatbot system selected for an application.

Communication subsystem 1224 may support both wired and/or wireless communication protocols. In certain examples, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1224 may provide wired network connectivity (e.g., Ethernet) in addition to or instead of a wireless interface.

Communication subsystem 1224 may receive and transmit data in various forms. In some examples, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
receiving a natural language query to be processed by a machine learning model, the machine learning model utilizing a dataset of natural language phrases for processing natural language queries;
determining, based on the natural language query, a feature dropout value for the machine learning model;
generating, based on the natural language query, a set of contextual features comprising a plurality of contextual features and a set of expressional features comprising one or more expressional features;
determining a feature correspondence between the plurality of contextual features and the one or more expressional features, to form a subset of contextual features comprising one or more contextual features corresponding to the one or more expressional features with which the feature correspondence is determined, among the plurality of contextual features;

removing, from the set of contextual features, at least a portion of the one or more contextual features of the subset of contextual features at a rate corresponding to the feature dropout value, to generate a set of modified contextual features;

generating a set of input features to include the set of modified contextual features and the one or more expressional features;

inputting, to the machine learning model, the set of input features; and processing, by the machine learning model, the set of input features, to generate an output with respect to the natural language query, wherein the feature dropout value comprises a first contextual feature dropout value corresponding to a first percentage of the plurality of contextual features of the set of contextual features.

2. The computer-implemented method of claim 1, wherein:

the feature dropout value further comprises a second contextual feature dropout value corresponding to a second percentage of the plurality of contextual features of the set of contextual features, and the removing further comprises removing the second percentage of the plurality of contextual features from the set of modified contextual features, to generate the set of modified contextual features.

3. The computer-implemented method of claim 1, wherein:

the feature dropout value further comprises a first expressional feature dropout value corresponding to a percentage of expressional features of the one or more expressional features;

the computer-implemented method further comprises modifying the set of expressional features by removing the percentage of expressional features from the set of expressional features, to generate a set of modified expressional features; and the set of input features is generated from the set of modified contextual features and the set of modified expressional features.

4. The computer-implemented method of claim 1, further comprising:

comparing the dataset of natural language phrases to a training dataset used to train the machine learning model; and determining, based on the comparison, a noise value corresponding to a number of natural language phrases in the dataset of natural language phrases and the training dataset associated with the same particular category and a number of natural language phrases in the dataset of natural language phrases and the training dataset associated with different categories, wherein the feature dropout value is determined at least in part based on the noise value.

5. The computer-implemented method of claim 1, wherein the machine learning model is a convolution neural network machine learning model and the set of input features corresponds to input nodes of a convolutional neural network.

6. A non-transitory computer-readable memory storing a plurality of instructions executable by one or more processors, the plurality of instructions comprising instructions that, when executed by the one or more processors, cause the one or more processors to perform a method including:

receiving a natural language query to be processed by a machine learning model, the machine learning model utilizing a dataset of natural language phrases for processing natural language queries;

determining, based on the natural language query, a feature dropout value for the machine learning model;

generating, based on the natural language query, a set of contextual features comprising a plurality of contextual features and a set of expressional features comprising one or more expressional features;

determining a feature correspondence between the plurality of contextual features and the one or more expressional features, to form a subset of contextual features comprising one or more contextual features corresponding to the one or more expressional features with which the feature correspondence is determined, among the plurality of contextual features;

removing, from the set of contextual features, at least a portion of the one or more contextual features of the subset of contextual features at a rate corresponding to the feature dropout value, to generate a set of modified contextual features;

generating a set of input features to include the set of modified contextual features and the one or more expressional features;

inputting, to the machine learning model, the set of input features; and processing, by the machine learning model, the set of input features, to generate an output with respect to the natural language query, wherein the feature dropout value comprises a first contextual feature dropout value corresponding to a first percentage of the plurality of contextual features of the set of contextual features.

7. The non-transitory computer-readable memory of claim 6, wherein:

the feature dropout value further comprises a second contextual feature dropout value corresponding to a second percentage of the plurality of contextual features of the set of contextual features, and the removing further comprises removing the second percentage of the plurality of contextual features from the set of modified contextual features, to generate the set of modified contextual features.

8. The non-transitory computer-readable memory of claim 6, wherein:

the feature dropout value further comprises a first expressional feature dropout value corresponding to a percentage of expressional features of the one or more expressional features;

the method further includes modifying the set of expressional features by removing the percentage of expressional features from the set of expressional features, to generate a set of modified expressional features; and the set of input features is generated from the set of modified contextual features and the set of modified expressional features.

9. The non-transitory computer-readable memory of claim 6, wherein the method further includes:

comparing the dataset of natural language phrases to a training dataset used to train the machine learning model; and determining, based on the comparison, a noise value corresponding to a number of natural language phrases in the dataset of natural language phrases and the training dataset associated with the same particular category and a number of natural language phrases in the dataset of natural language phrases and the training dataset associated with different categories,
wherein the feature dropout value is determined at least in part based on the noise value.

10. The non-transitory computer-readable memory of claim 6, wherein the machine learning model is a convolution neural network machine learning model and the set of input features corresponds to input nodes of a convolutional neural network.

* * * * *